(12) United States Patent
Kugimiya et al.

(10) Patent No.: US 6,231,024 B1
(45) Date of Patent: May 15, 2001

(54) FORMWORK FORMING UNIT

(75) Inventors: Yuji Kugimiya, Aichi-ken; Yukihiro Kugimiya, Owariasahi, both of (JP)

(73) Assignee: Kabushikikaisha Kugin, Nishikasugai-gun (JP)

( * ) Notice: Subject to any disclaimer, the term of this patent is extended or adjusted under 35 U.S.C. 154(b) by 0 days.

(21) Appl. No.: 09/419,119

(22) Filed: Oct. 15, 1999

(30) Foreign Application Priority Data

Oct. 19, 1998 (JP) .................................................. 10-297084

(51) Int. Cl.⁷ .................................................. E04G 11/06
(52) U.S. Cl. .................................................. 249/33; 52/426
(58) Field of Search .................................................. 249/33, 40, 190; 52/425, 426, 427, 431, 742.14

(56) References Cited

U.S. PATENT DOCUMENTS 5,092,093 * 3/1992 Lu .................................................. 52/426

FOREIGN PATENT DOCUMENTS

| 1164300 | * 10/1958 | (FR) | 52/426 |
| 61-116838 | 7/1986 | (JP) | |
| 02178421 | 7/1990 | (JP) | |
| 05287761 | 11/1993 | (JP) | |
| 2618157 | 3/1997 | (JP) | |
| 10001952 | 1/1998 | (JP) | |

* cited by examiner

*Primary Examiner*—James O. Hansen
(74) *Attorney, Agent, or Firm*—Armstrong, Westerman, Hattori, McLeland & Naughton, LLP

(57) ABSTRACT

A formwork forming unit for use in forming a concrete mold serving as a foundation of a building includes a frame-shaped form panel disposed to define a placing space for concrete and a bar-shaped separator. The form panel includes a plurality of first reinforcing beams and a plurality of second reinforcing beams each of which has a smaller diameter than each first beam and formed into a shape of a frame. The form panel further includes a meshed member fixed thereto so as to cover its inside. The separator is attached to the oppositely disposed form panels so as to bridge the form panels when a plurality of the form panels are disposed to define the placing space for the concrete. The separator has both ends folded so as to be formed into hook portions respectively. The hook portions are engaged with the first beams of the oppositely disposed form panels and crimped such that the separator is fixed to the form panels.

2 Claims, 28 Drawing Sheets

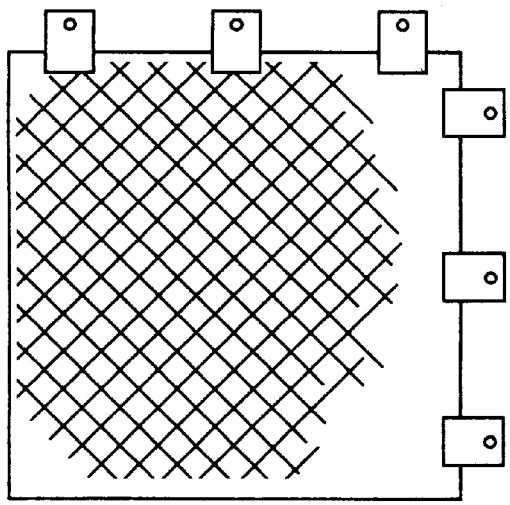
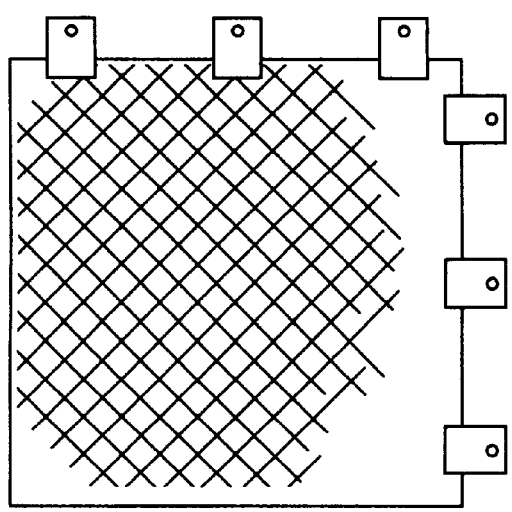
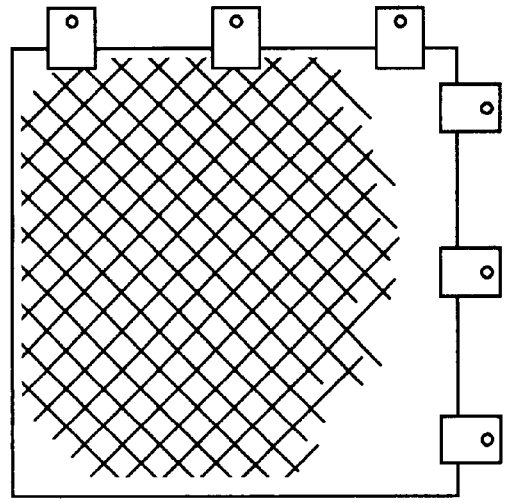
Fig.21

FORMWORK FORMING UNIT

BACKGROUND OF THE INVENTION

1. Field of the Invention

This invention relates to a formwork forming unit suitable for use in forming a concrete mold serving as a foundation of a building or the like and a method of forming such a formwork.

2. Description of the Prior Art

In forming a concrete mold serving as a foundation of a building, face plates such as composite plates or metal plates are assembled into a formwork according to the shape of a concrete mold to be formed. Thereafter, concrete is placed in the formwork and hardened. The formwork is disassembled after the concrete has been hardened. In the above-described method, the assembly and disassembly of the formwork require much labor. Further, since an amount of material to be used is increased, the transport of material costs a great deal and an amount of waste material is increased.

In view of these problems, various methods eliminating the disassembly of formwork have been proposed. For example, Japanese patent publication No. 2-178421A discloses a formwork forming unit in which wire mesh frames each of which has rough meshes and includes a steel wire frame are continuously connected to one another. A fastening wire having both ends formed with generally R-shaped engagement portions respectively is bridged between the wire mesh frames for reinforcement, so that a formwork is formed. A metal lath having fine meshes is attached to the inside of each of the wire mesh frames constituting the formwork.

When concrete is placed in the above-described formwork, a concrete mold is formed with the metal laths preventing leakage of the concrete. Since the formwork is embedded in the concrete hardened, the formwork need not be disassembled. As a result, a labor saving can be achieved.

Japanese patent publication No. 10-1952A discloses another formwork forming unit as shown in FIG. 28. A mesh such as the metal lath is welded to a metal support having rough meshes so as to cover the meshes, so that a formwork forming member 1 is formed. A plurality of formwork forming members 1 are assembled into a formwork so as to define a forming space for a concrete mold. Connecting members 2 are attached between the opposed formwork forming members 1 for reinforcement respectively and thereafter, concrete is placed in the forming space. Each connecting member 2 includes a bar-like separator 2a having both ends formed with respective male thread portions and two hook-shaped members 2b fixed to the male thread portions by nuts respectively.

In attachment of the connecting members 2, the hook-shaped member 2b is fixed to the male thread portion at one end of the separator 2a. The separator 2a is then inserted from the other end thereof through the formwork forming members 1 so as to bridge them. The hook-shaped member 2b is engaged with the support frame of one formwork forming member 1. Another hook-shaped member 2b is fixed to the male thread portion at the other end of the separator 2a with an amount of threading engagement of the nut being adjusted and is further engaged with the support frame of the other formwork forming member 1. In this construction, too, a concrete mold is formed with the mesh such as the metal lath preventing leakage of the concrete. The disassembly of the formwork is not required and the strength of the concrete mold is increased since it is reinforced by the connecting members.

The above-described formwork forming units have the following problems. In the former unit, the wire mesh frames are connected to one another and fastening wires are attached between the opposed frames, so that the formwork is formed. The metal laths then need to be attached to the inside of the formwork. As a result, the forming of the formwork requires much time. In the latter unit, when the connecting members 2 are attached to the formwork forming members 1, the amount of threading engagement of each of the nuts with the male thread portions at both ends of the separator 2a respectively needs to be adjusted so that the hook-shaped members 2b are positioned. As a result, the attachment of the connecting members 2 requires much time.

SUMMARY OF THE INVENTION

Therefore, an object of the present invention is to provide a formwork forming unit in which the formwork used to form a concrete mold can easily be formed, the formwork need not be disassembled and the strength of the formed concrete mold can be improved, and a method of forming such a formwork.

To accomplish the object, the present invention provides a formwork forming unit comprising a generally frame-shaped form panel disposed to define a placing space for concrete, the form panel including a plurality of first reinforcing beams and a plurality of second reinforcing beams each of which has a smaller diameter than each first beam and formed into a shape of a frame, the form panel further including a meshed member fixed thereto so as to cover an inside thereof, and a generally bar-shaped separator attached to the oppositely disposed form panels so as to bridge said form panels when a plurality of the form panels are disposed to define the placing space for the concrete, the separator having both ends folded so as to be formed into hook portions respectively, the hook portions being engaged with the first beams of the oppositely disposed form panels and crimped such that the separator is fixed to the form panels.

According to the above-described unit, the hook portions of the separator are engaged with the oppositely disposed form panels respectively and then crimped such that the separator is fixed to the form panels. Thus, the separator can easily be attached to the form panels so as to bridge the form panels for improvement of the strength of the formwork. Consequently, the formwork used for forming the concrete mold can easily be formed. Further, since the hook portions are engaged with the first beams respectively, the operator can easily carry out the attachment and a high strength of the overall formwork can be achieved. Additionally, the weight of the form panel can be reduced since the second beams are suitably used as reinforcing members.

Concrete is placed in the formwork formed as described above. The meshed member prevents leakage of the concrete. Since the form panels are embedded in the concrete after the concrete has been hardened, the formwork need not be disassembled. Further, as the result of provision of the meshed member, an area of the placed concrete in contact with air is increased such that the hardening of the concrete is enhanced. Consequently, a concrete mold can be formed promptly even in a job site where water springs.

The form panel is preferably generally flat or bent. Consequently, the form panel can readily be handled when the form panel is flat. Although the form panel is flat, the side thereof may take various shapes. In a case where the form panel is bent, generally L-shaped or U-shaped form panels are assembled together when a generally prismatic formwork is formed, for example. As a result, suitable form panels are selected and disposed. Consequently, the number of components can be reduced and an energy saving can be achieved in the disposing work.

The form panel preferably includes a plurality of reinforcing bars welded together into the shape of a frame and a metal lath made of a preselected metal and welded to an inside thereof. Consequently, since the form panel is formed by welding reinforcing bars and the metal lath together, the form panel can easily be formed at a low cost.

The hook portions of the separator are preferably slightly displaced from each other axially so as not to be coplanar with each other. For example, when one of the hook portions is directed generally vertically and is caught on the first beam, the other hook slightly projects horizontally. Consequently, the hook can easily be held. Further, since the hooks are axially displaced, the separator can be prevented from clattering.

The hook portions of the separator preferably include a first hook portion engaged with one of the first beams of one formwork crimped to be fixed said one first beam and a second hook portion engaged with one of the first beams of the other formwork. The second hook portion of the separator is engaged with the first beam of one form panel and the first hook portion is engaged with the first beam of the other form panel. Thus, a labor saving can be achieved in the crimping of the hook portion. Further, even when a space required for the crimping work is not obtained at one form panel side, the second hook portion is engaged with the first beam of the other form panel such that the separator can be attached to the form panel.

The second hook portion preferably has a longer folded portion than the first hook portion. Consequently, the separator can be prevented from being detached from the first beam even when subjected to a large force.

The form panel preferably includes a connecting piece provided on an edge of the form panel so as to be outwardly open and a fixing member closing the open side of the connecting piece when the edge of the other form panel is inserted into an interior of the connecting piece. Consequently, the form panels can easily be connected together.

The connecting piece preferably includes a pair of band plate pieces confronting each other with a clearance therebetween, the clearance being approximately equal to a thickness of the form panel, the band plate pieces having through holes formed near open ends thereof respectively, and wherein the fixing member is inserted through the holes of the band plate pieces, thereby closing the open side of the connecting piece. Since the edge of the form panel is held between the paired band plate pieces, the assembling work can be simplified.

The connecting piece is preferably formed by folding a single band plate piece generally into a U-shape and the first beam forming a panel of the form panel is fitted into an inside of the U-shaped connecting piece. Consequently, the connecting piece can easily be constructed. Further, since a portion of the form panel having a highest strength is supported by the connecting piece, the strength of the form panel can be improved.

The invention also provides a method of forming a formwork using a formwork forming unit which comprises a generally frame-shaped form panel including a plurality of first reinforcing beams, a plurality of second reinforcing beams each of which has a smaller diameter than each first beam and a meshed member fixed thereto so as to cover an inside thereof, and a generally bar-shaped separator having both ends folded so as to be formed into hook portions respectively. The method comprises disposing the form panels so as to define a placing space for concrete, engaging the hook portions with the first beams of the oppositely disposed form panels so that the separator bridges the form panels, and crimping the hook portions such that the separator is fixed to the form panels.

BRIEF DESCRIPTION OF THE DRAWINGS

Other objects, features and advantages of the present invention will become clear upon reviewing the following description of the preferred embodiment, made with reference to the accompanying drawings, in which:

FIG. 21 is a plan view of the form panels, showing the locations of the connecting brackets attached to the form panels;

DETAILED DESCRIPTION OF THE PREFERRED EMBODIMENT

Figure 1:
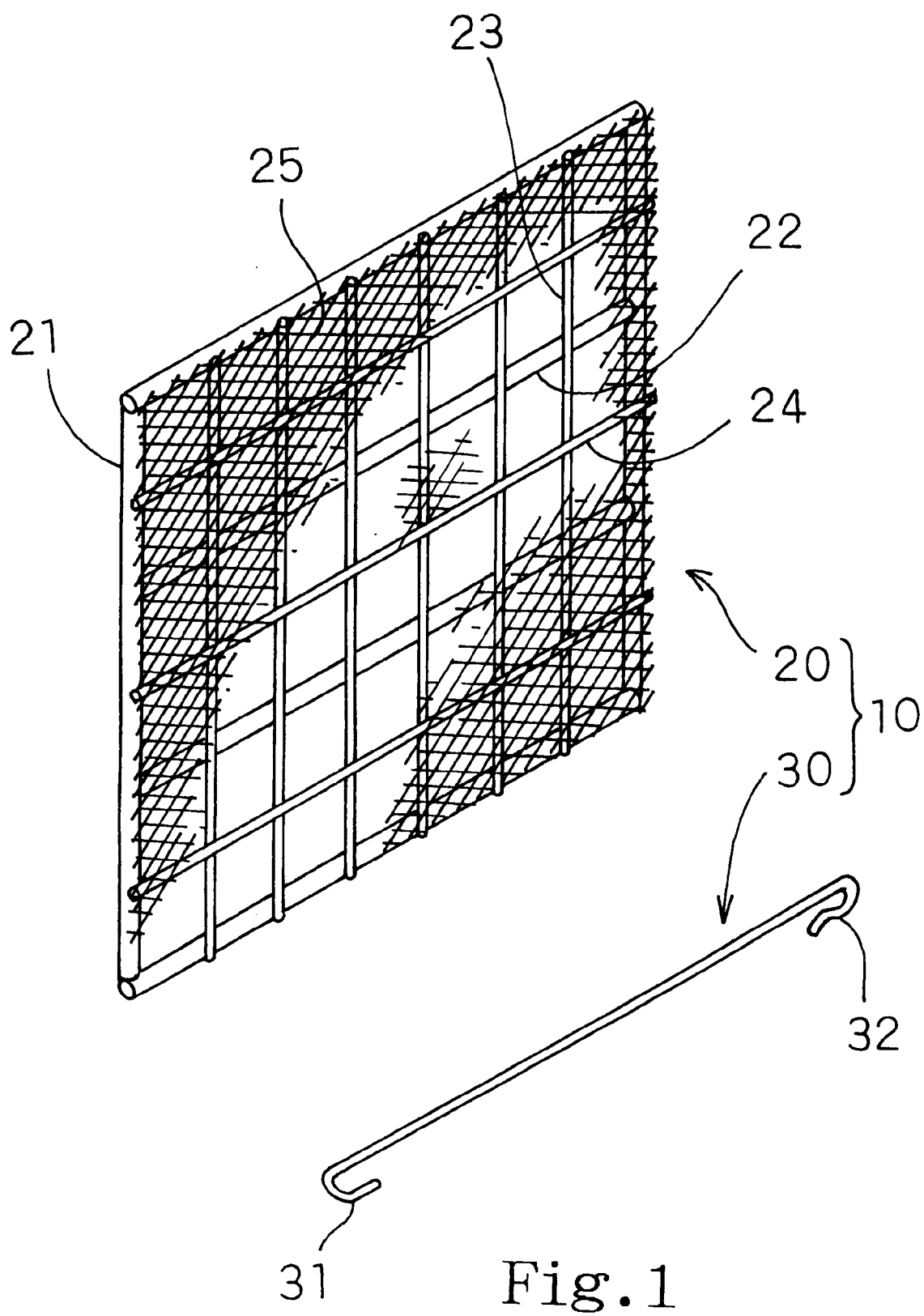
FIG. 1 is a perspective view of the formwork forming unit of one embodiment in accordance with the present invention.

One embodiment of the present invention will be described with reference to the accompanying drawings. Referring to FIG. 1, a formwork forming unit 10 of the embodiment in accordance with the invention is shown. The formwork forming unit 10 comprises a form panel 20 and a separator 30. When a concrete mold serving as a foundation of a building is to be formed, the formwork forming unit 10 is used to form a formwork. Concrete is placed in the formwork and then hardened so that a concrete mold is formed.

Figure 2:
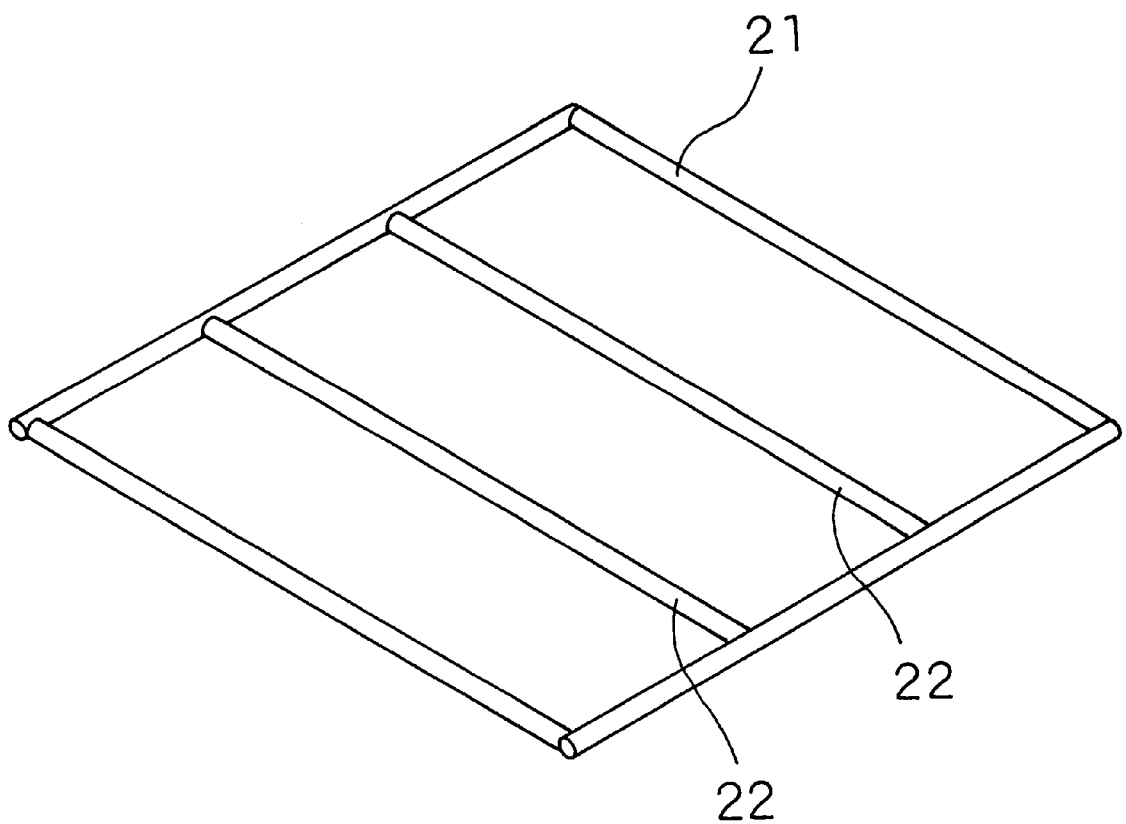
FIG. 2 is a perspective view of a metal support frame, showing a first step of the forming of a form panel.

The form panel 20 includes a frame formed by assembling reinforcing bars into the shape of a grid and a metal meshed member or metal lath fixed to the frame so as to cover an inside of the frame. More specifically, two reinforcing bars, each of which has a diameter ranging between 10 and 15 mm according to the length of the form panel 20 to be formed, are prepared. Two reinforcing bars, each of which has a diameter ranging between 10 and 15 mm according to the breadth of the form panel 20 to be formed, are also prepared. A generally rectangular metal support frame 21 as shown in FIG. 2 is formed by welding the reinforcing bars to one another. Reinforcing bars each of which has a diameter ranging between 10 and 15 mm are prepared to serve as a plurality of reinforcing metal bars 22. The metal bars 22 are welded to the support frame 21 so as to bridge the lengthwise reinforcing bars and so as to be spaced away from each other. As a result, a ladder-like frame is formed.

Figure 3:
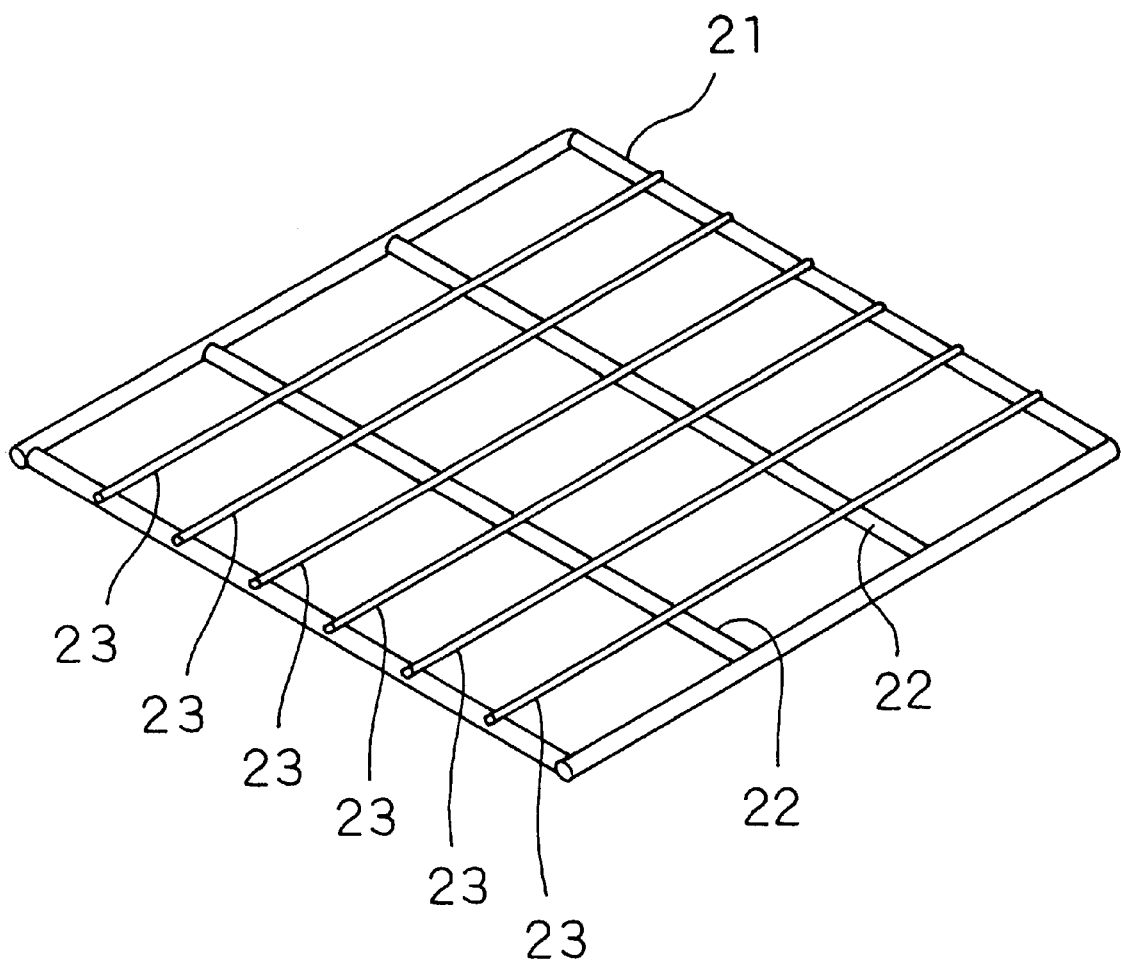
FIG. 3 is a perspective view of the metal support frame, showing a second step of the forming of the form panel.
Figure 4:
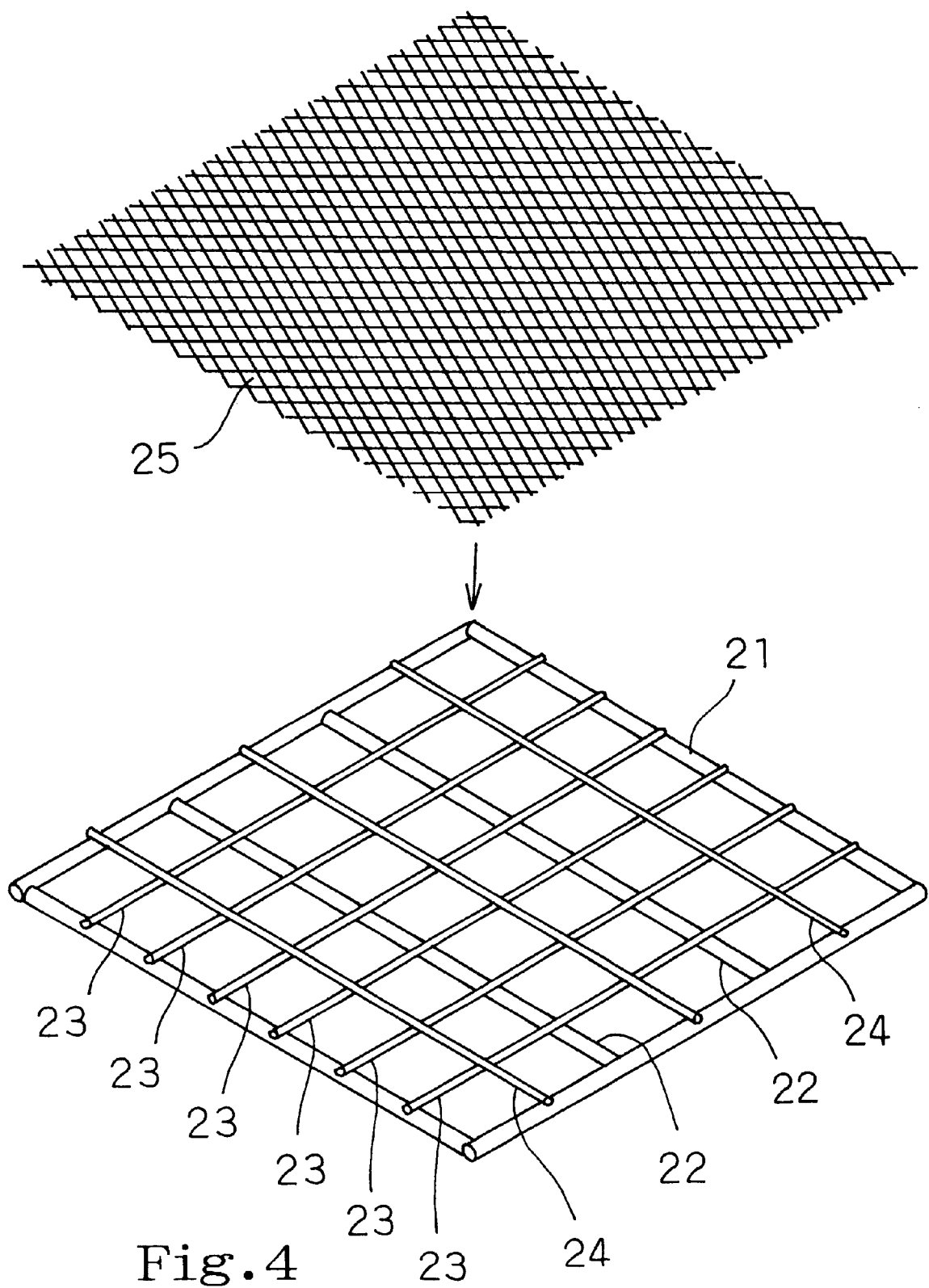
FIG. 4 is a perspective view of the metal support frame, showing a final step of the forming of the form panel.

Thereafter, a plurality of reinforcing lengthwise wires 23 are prepared by cutting a reinforcing bar having a diameter ranging between 5 and 8 mm according to the length of the support frame 21. The wires 23 are welded to the support frame 21 so as to bridge the breadthwise reinforcing bars and so as to be spaced away from one another, as shown in FIG. 3. Further, a plurality of reinforcing breadthwise wires 24 are prepared by cutting the reinforcing bar having the diameter ranging between 5 and 8 mm according to the breadth of the support frame 21. The wires 24 are welded to the support frame 21 so as to bridge the lengthwise reinforcing bars and so as to be located between the reinforcing bar of the support frame 21 and the reinforcing metal bar 22 adjacent to the former or between the adjacent reinforcing metal bars 22. As a result, the wires 23, bars 22 and wires 24 are netted such that the form panel 20 has such a structure as to withstand the pressure applied thereto from the side thereof. Finally, a metal meshed member or metal lath 25 according to the shape of the side of the support frame 21 is welded to the support frame 21.

The metal bars 22 serving as first beams, the lengthwise wires 23 serving as second beams having a smaller diameter than the first beams, and breadthwise wires 24 are assembled to the support frame 21 so that the strength of the overall form panel 20 is increased, as described above. However, the weight of the form panel 20 can be reduced when the lengthwise and breadthwise wires 23 and 24 are assembled to the support frame 20.

The separator 30 will now be described. A reinforcing bar having a diameter ranging between 5 and 8 mm and a predetermined length is prepared. Both ends of the reinforcing bar are folded back toward the opposite ends to be formed into first and second hook portions 31 and 32 respectively. The first and second hook portions 31 and 32 are engaged with the metal bars 22 of the form panel 20 respectively as will be described later. The first and second hook portions 31 and 32 have respective shapes slightly different from each other. More specifically, a folded portion of the second hook portion 32 is slightly longer than a folded portion of the first hook portion 31. An end of the folded portion of the second hook portion 32 is further bent outward. Further, the first and second hook portions 31 and 32 are slightly displaced from each other axially so as not to be coplanar with each other.

Figure 6:
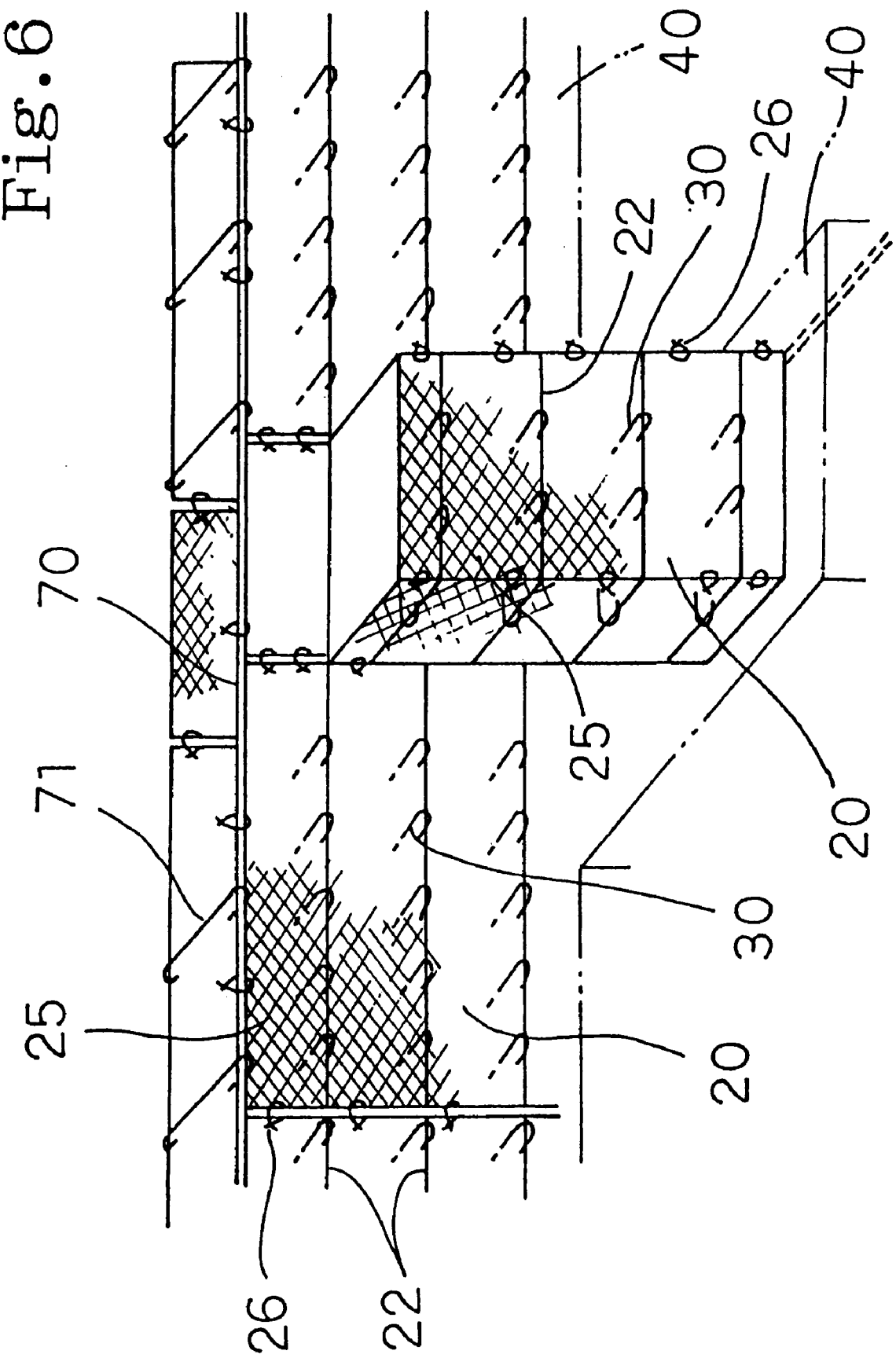
FIG. 6 is a schematic perspective view of an example of formwork formed using the formwork forming unit.

A method of forming a concrete mold using the formwork forming unit 10 will now be described. Referring to FIG. 6, an example of formwork formed using the formwork forming unit 10 is shown. First, a hole where a concrete mold is to be formed is dug and a leveling concrete 40 is embedded in the hole. A line is inked on the top of the leveling concrete 40. A plurality of the form panels 20 are connected to one another laterally along the inked line, being caused to stand. More specifically, binding wires 26 are wound on side edges of the support frames 21 of the adjacent form panels 20 with the side of each form panel to which the metal meshed member 25 is attached being directed inside, so that the support frames 21 are bound.

Figure 7:
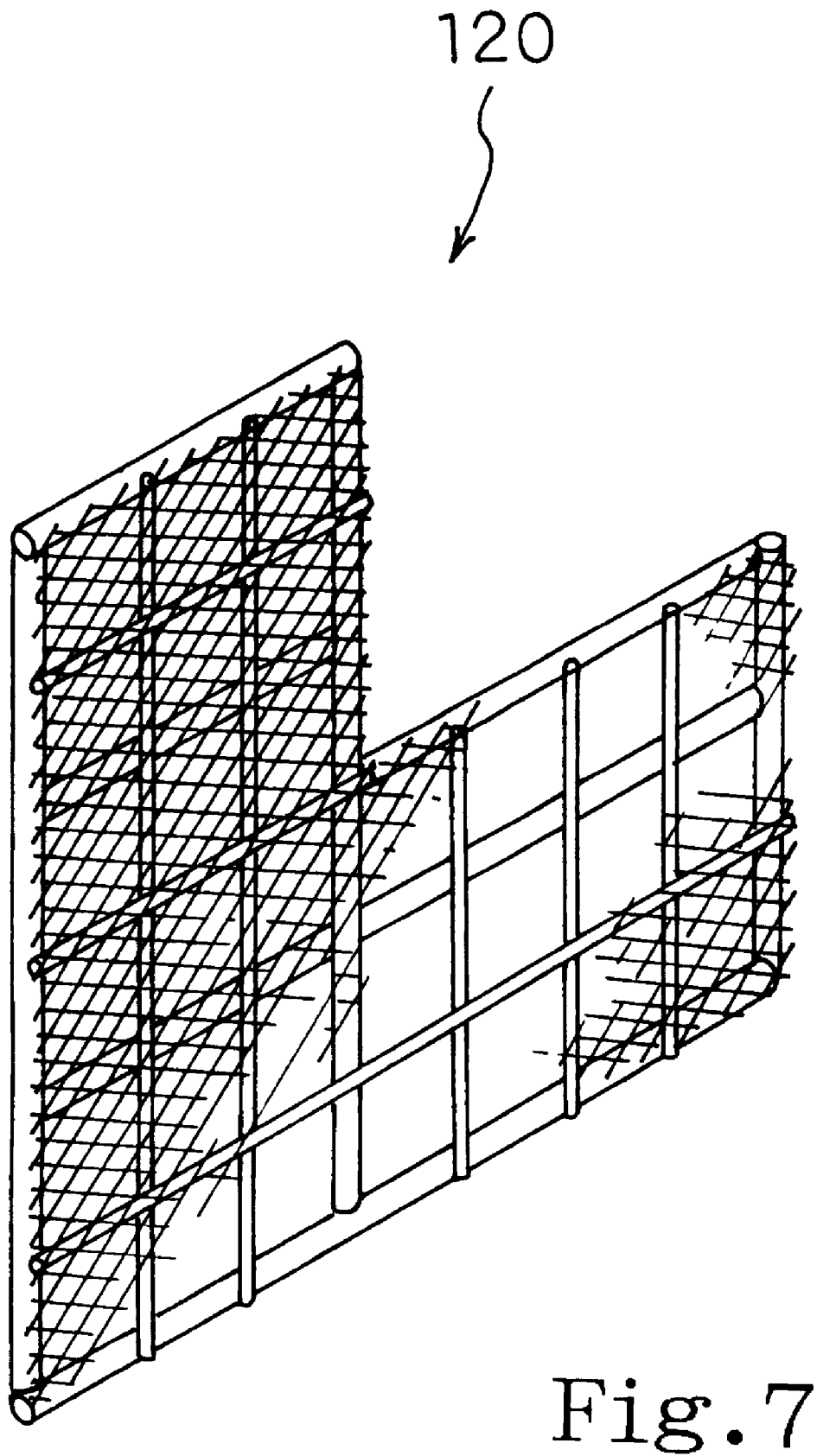
FIG. 7 is a perspective view of a modified form of form panel.
Figure 8:
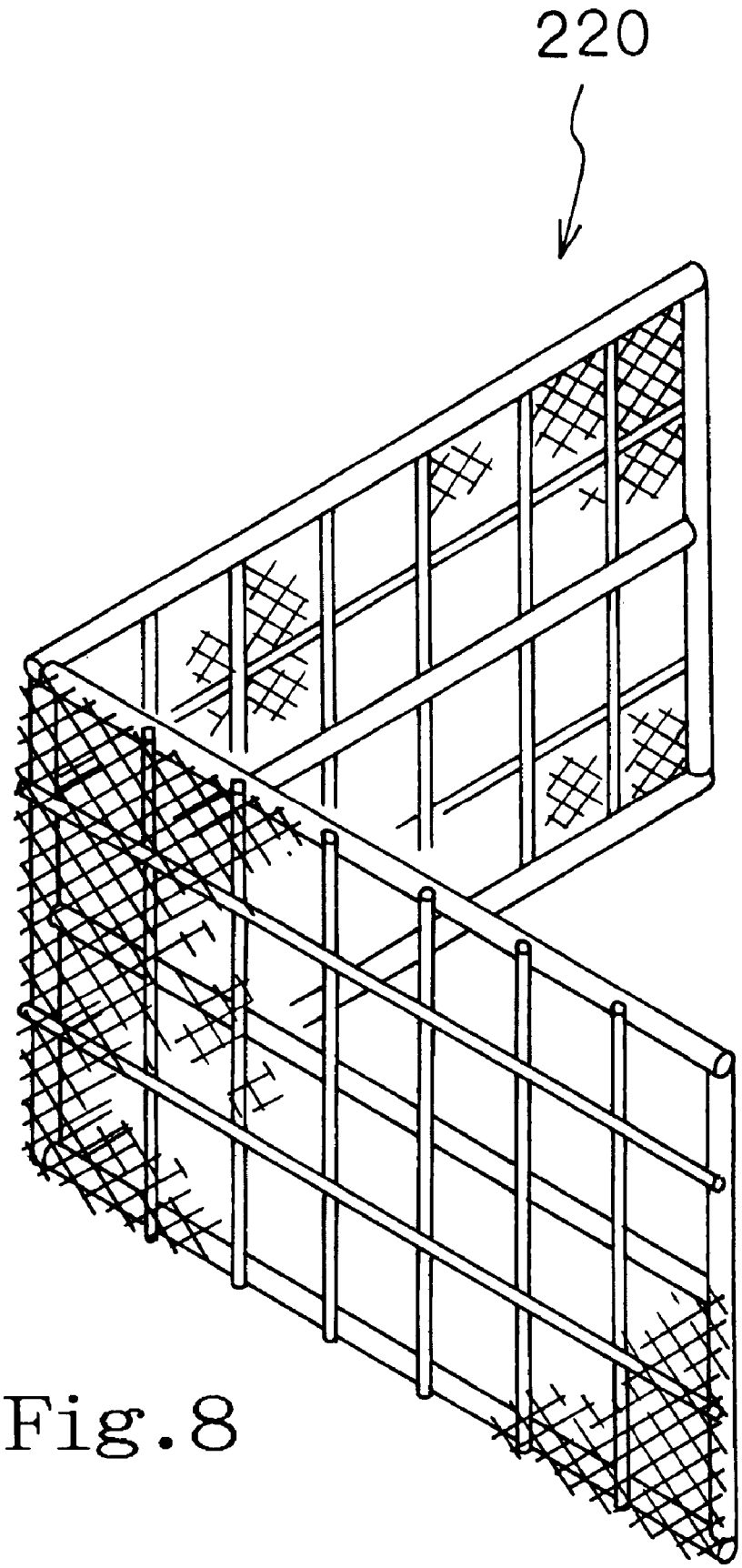
FIG. 8 is a perspective view of another modified form of form panel.

Of course, the concrete molds to be formed have various shapes and various sizes. Accordingly, the shapes and sizes of the form panels to be used are previously determined at the stage of design, and the form panels are assembled according to the determined shapes and sizes. For example, the form panel 20 as shown in FIG. 1 is generally rectangular and flat. However, a form panel 120 as shown in FIG. 7 may be used. The form panel 120 has such a shat that a part of the rectangular flat form panel is cut out. Further, the form panel need not be flat. For example, a generally L-shaped form panel as shown in FIG. 8 may be used. Thus, the shape and size of the form panel may be changed.

Figure 9:
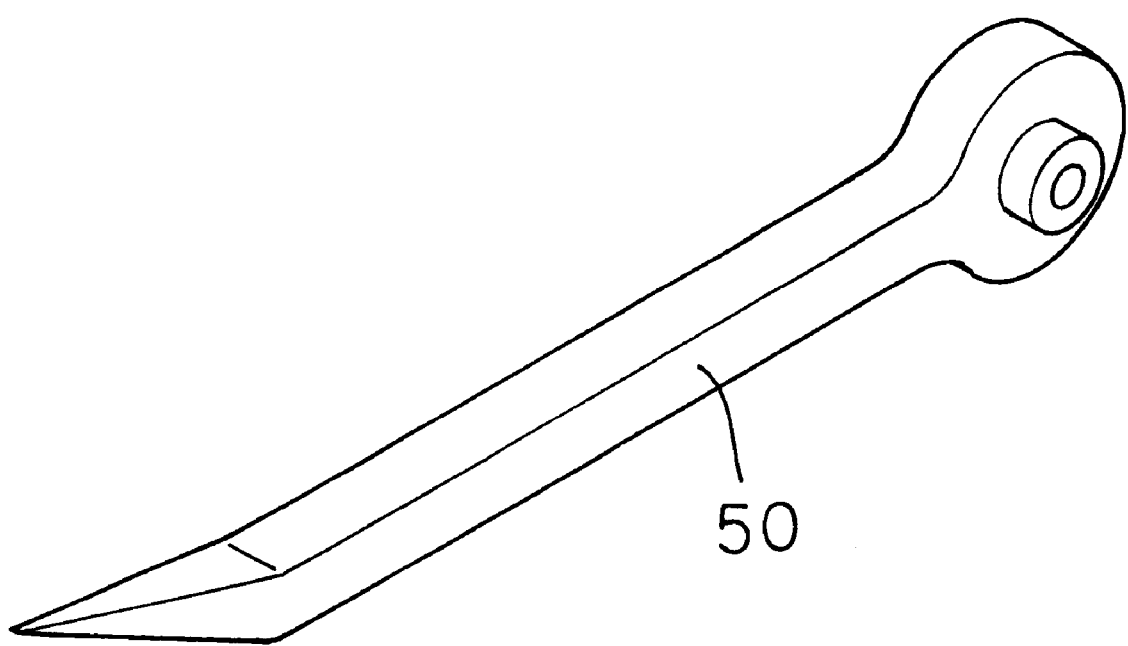
FIG. 9 is a perspective view of a tool for cutting a metal net of the form panel.
Figure 10:
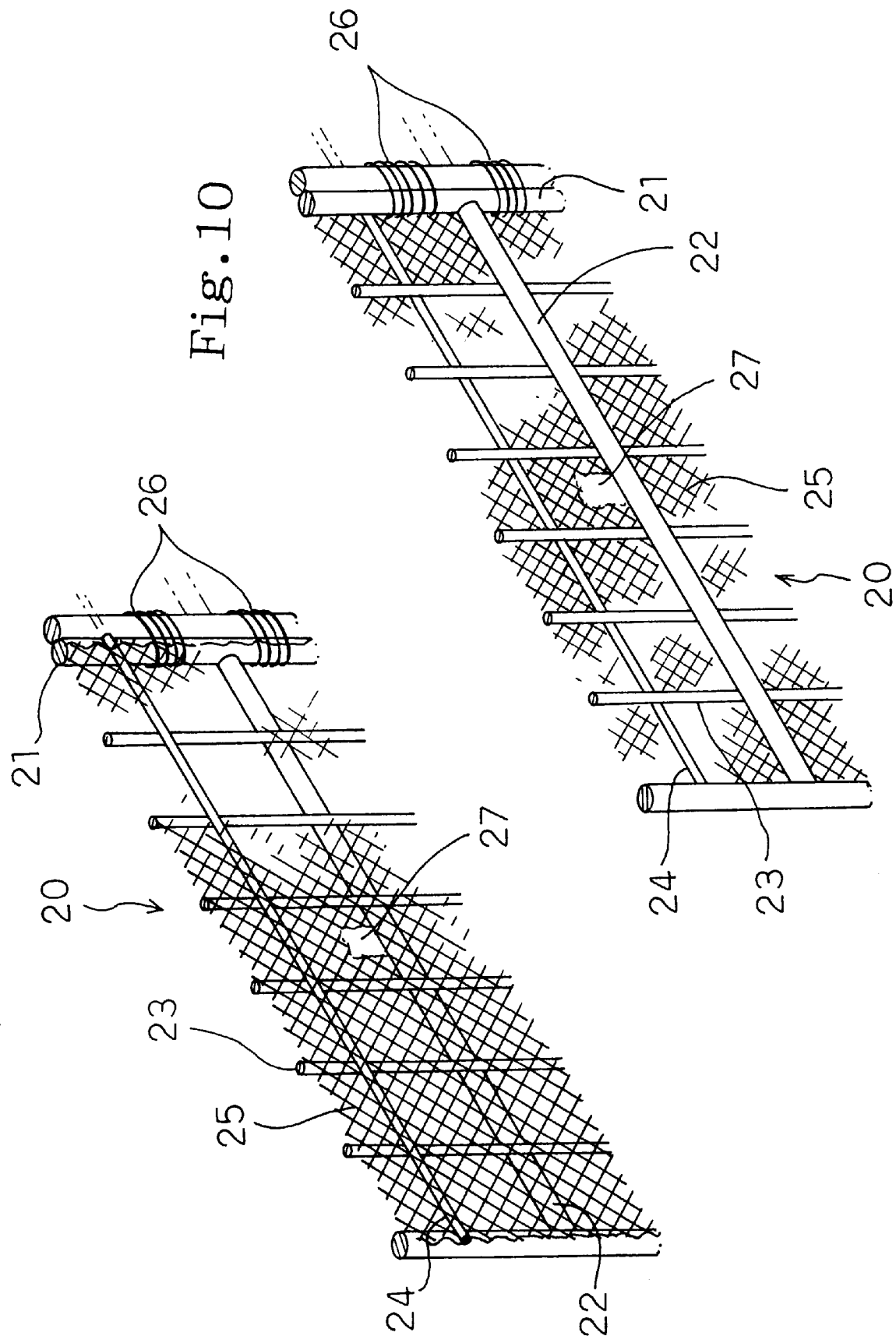
FIG. 10 is a partial perspective view of the form panels, showing the state where the metal meshed member has been cut so that a slit-like opening is formed.

Thereafter, the separators 30 are attached to form panels 20 so as to bridge the opposed form panels 20. It is assumed that the separators 30 are formed to have lengths according to a distance between the opposed form panels 20. In the attachment of the separators 30, a part of the metal meshed member 25 corresponding to the location of the separator 30 is cut off by a tool 50 as shown in FIG. 9, so that a slit-like opening 27 as shown in FIG. 10 is formed. The separator 30 is inserted through the opening 27. As understood from FIG. 9, the tool 50 is formed into the shape of a bar and has a distal end slightly bent and tapered. When the metal meshed member 25 is cut, the distal end of the tool 50 is inserted through one mesh of the metal meshed member, being caught on a metal wire, whereby the metal meshed member is cut off. Further, the metal meshed member 25 of the form panel 20 at the opposite side is cut so that the slit-like opening 27 is formed therein, in the same manner as described above. The first and second hook portions 31 and 32 are engaged with the reinforcing bars 22 of the opposed form panels 20 respectively so that the separator 30 is attached to the opposed form panels. Accordingly, the opening 27 is located around the reinforcing bars 22.

Figure 5:
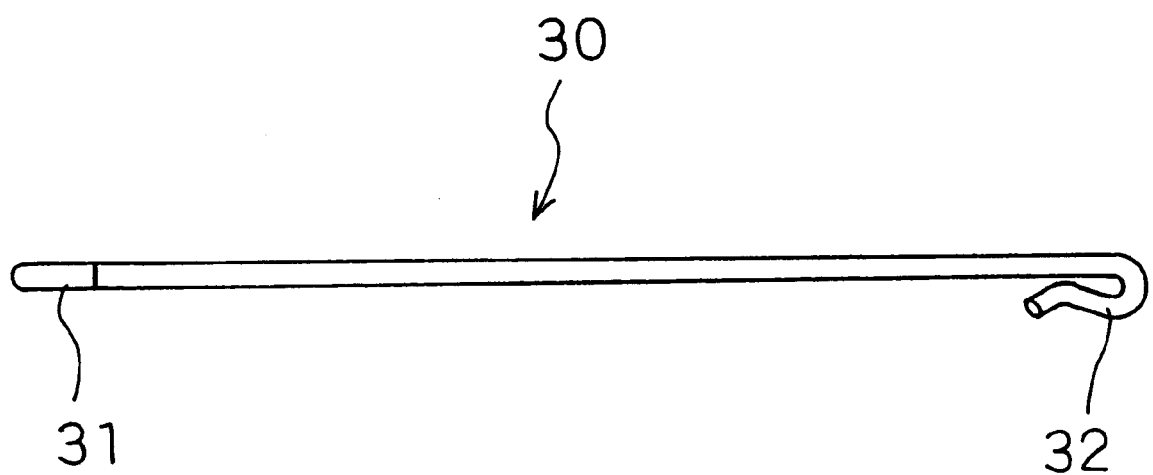
FIG. 5 is a plan view of a separator.
Figure 11:
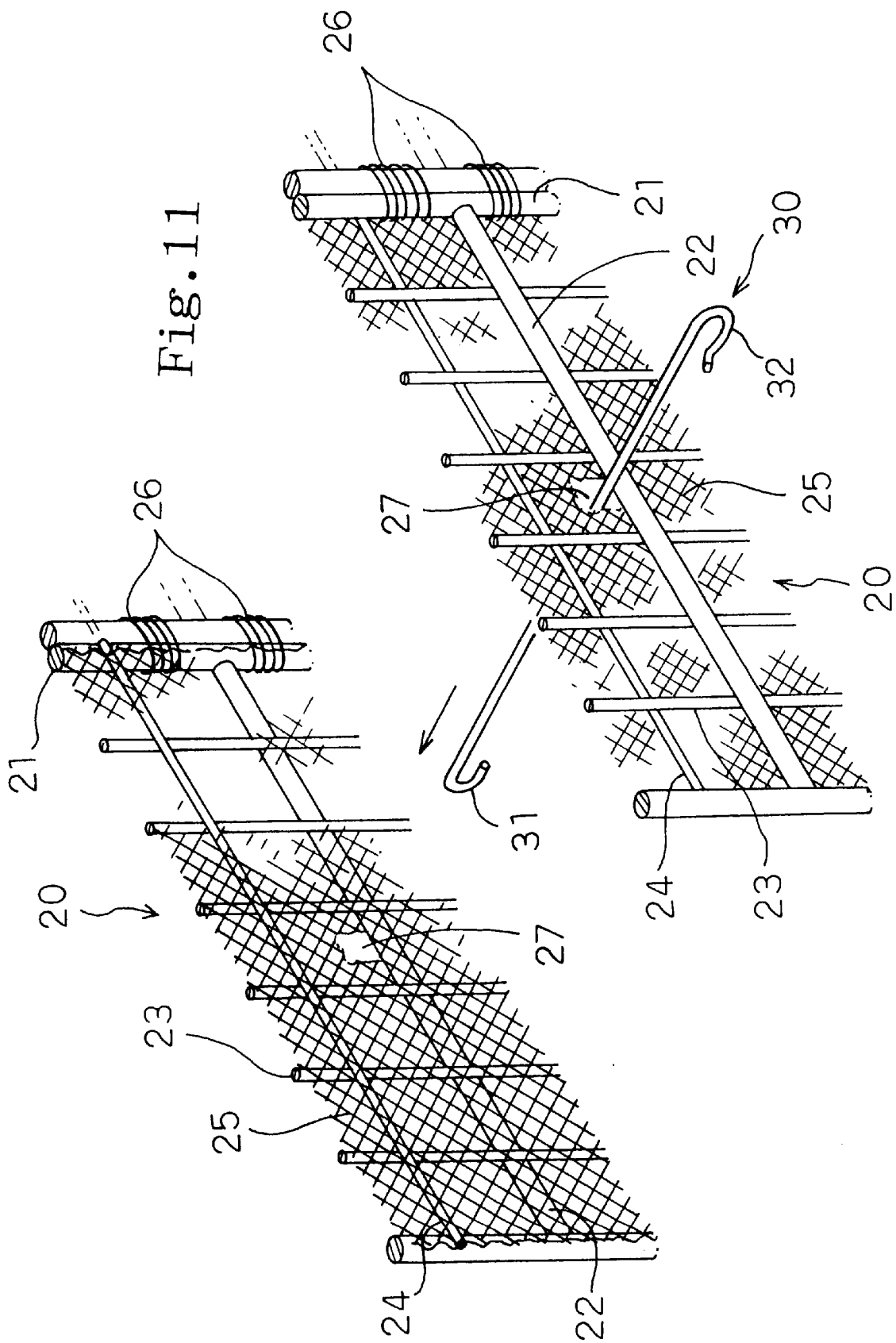
FIG. 11 is a partial perspective view of the form panels, showing a step of attaching the separator to the form panels.
Figure 12:
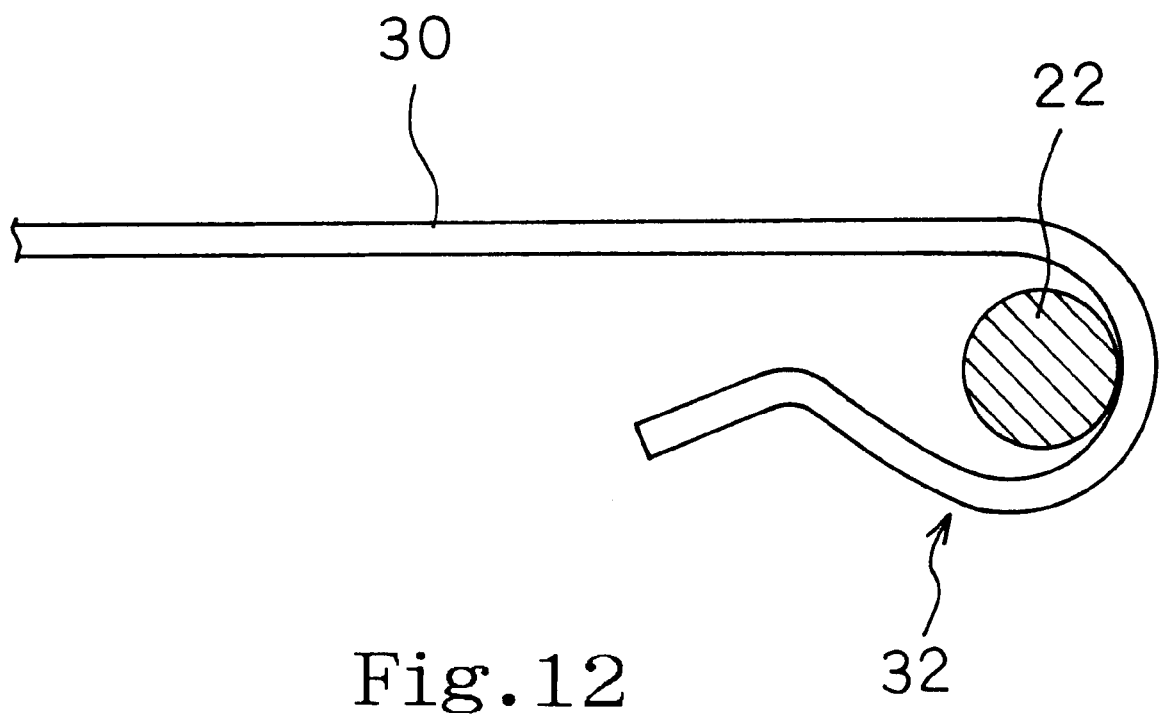
FIG. 12 is an enlarged partial side view of the separator, showing the state where a second hook portion of the separator is engaged with a reinforcing metal bar.
Figure 13:
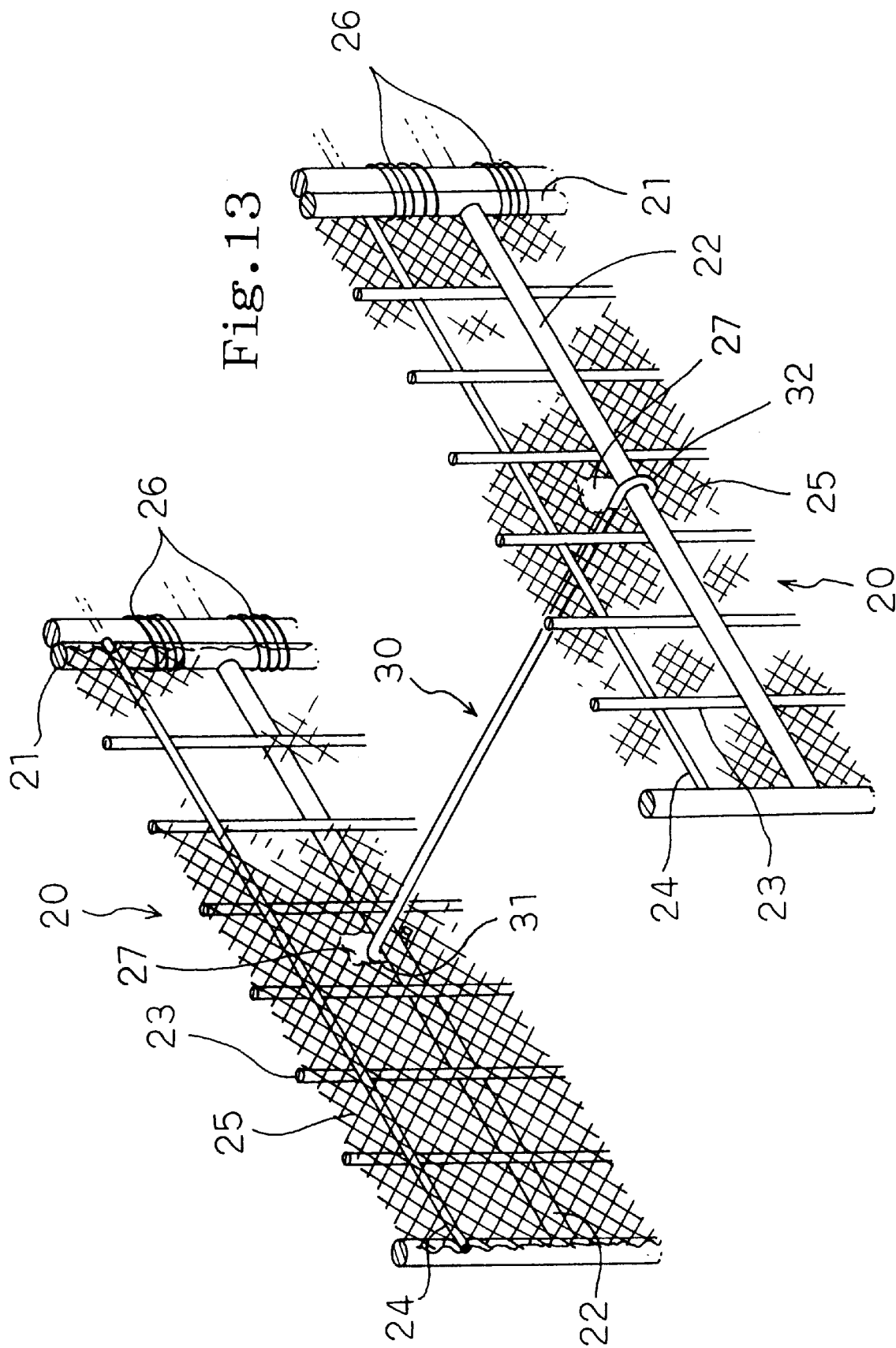
FIG. 13 is a partial perspective view of the form panels and the separator engaged with the metal bar.

The second hook portion 32 side is held so that the first hook portion 31 is directed vertically. The first hook portion 31 side is then inserted through the opening 27 of one of the opposed form panels 20 from outside as shown in FIG. 11. As understood from FIG. 5, since the first and second hook portions 31 and 32 are slightly displaced from each other axially so as not to be coplanar with each other, the second hook portion 32 slightly projects horizontally so as to be easily held. Thereafter, the separator 30 is further inserted and then, the second hook portion 32 is caught on the metal bar 22 from above to be engaged therewith as shown in FIG. 12. The first hook portion 31 is then inserted through the opening 27 of the other of the opposed form panels 20. Since the distal end of the second hook portion 32 is outwardly bent, the second hook portion 32 is easily caught on the metal bar 22. The first hook portion 31 side is then engaged with the metal bar 22 of the form panel 20 at the opposite side in the same manner. As a result, the separator 30 bridges the form panels 20 as shown in FIG. 13.

The second hook portion 32 side having the longer folded portion is first engaged with the metal bar 22. In other respects, the attaching sequence may be changed. For example, the second hook portion 32 may first be inserted through the opening 28 of one form panel 20 to be engaged with the metal bar 22 and subsequently, the first hook portion 31 may be inserted through the opening 27 of the other form panel 20 to be engaged with the metal bar 22.

Figure 14:
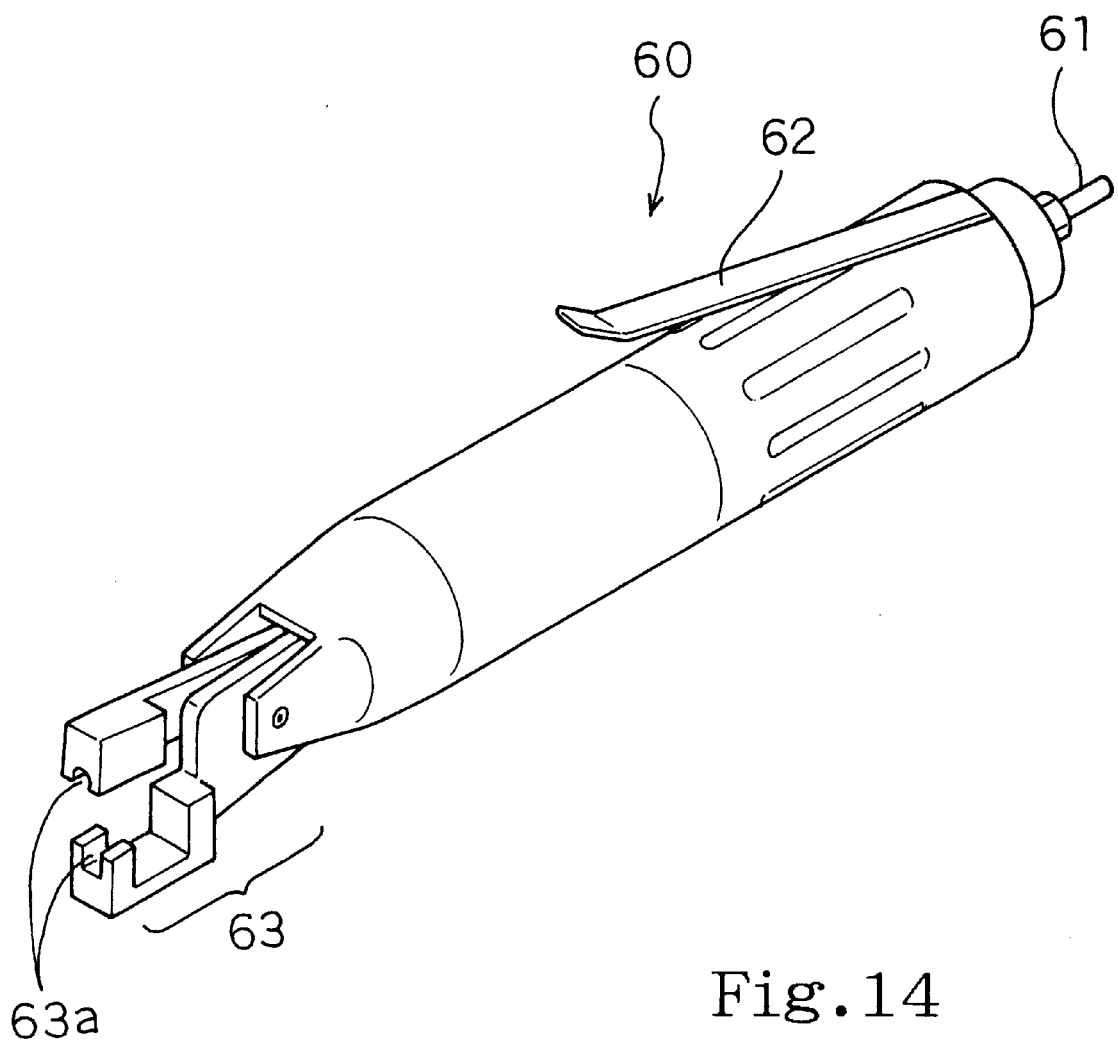
FIG. 14 is a perspective view of a jig for crimping a first hook portion.
Figure 15:
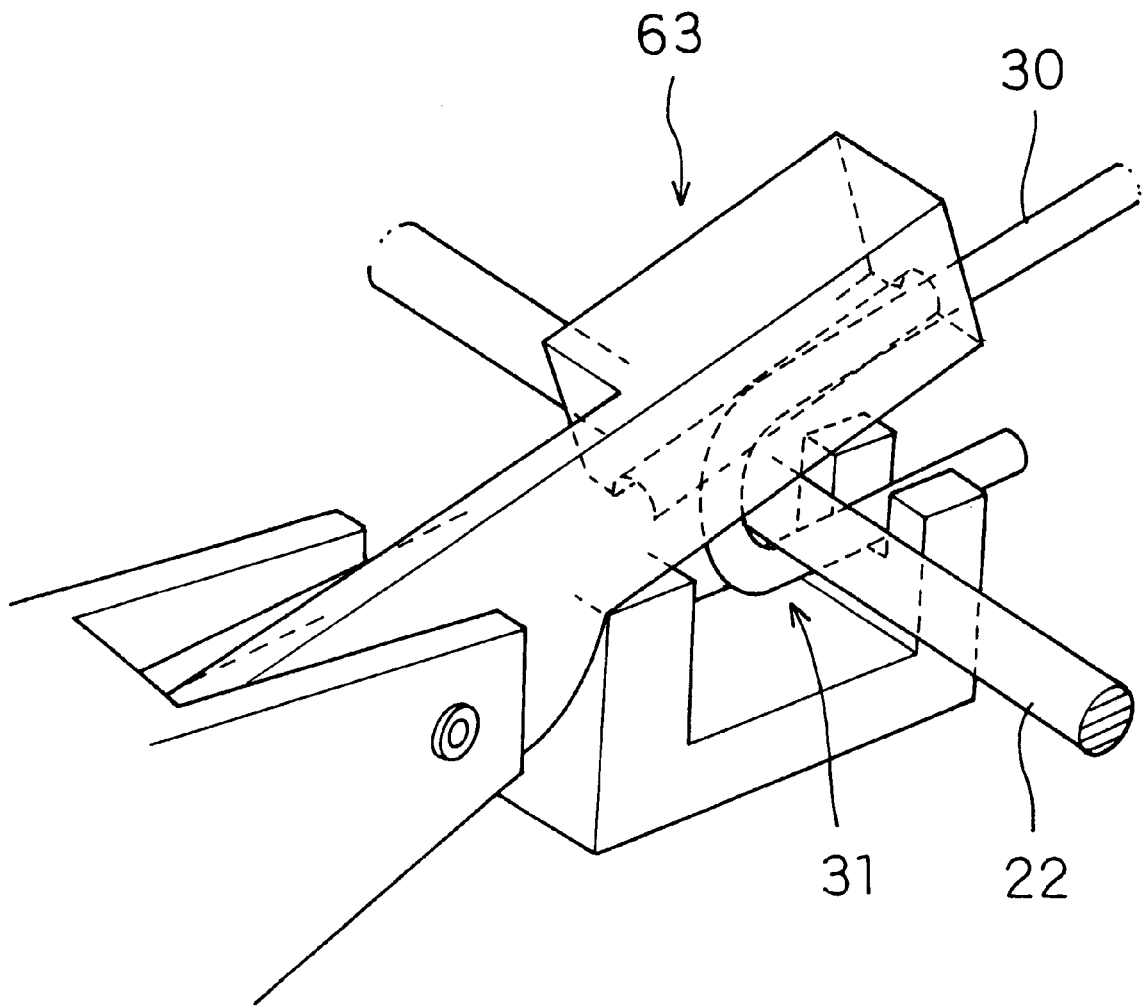
FIG. 15 is an enlarged partial perspective view of the first hook portion which is being crimped with the jig.
Figure 16:
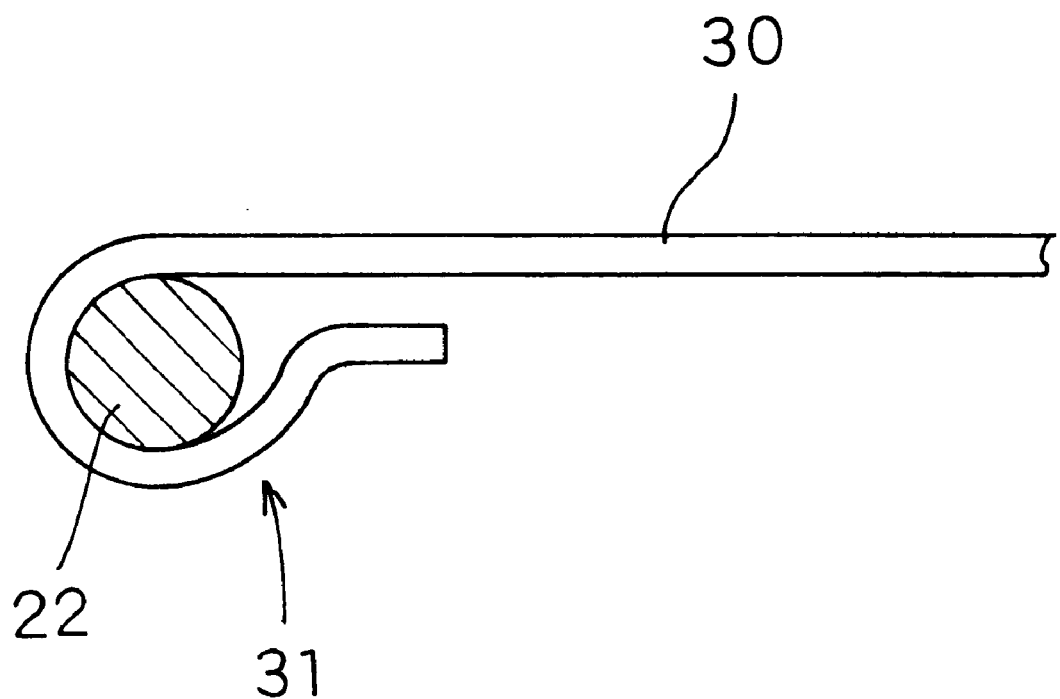
FIG. 16 is an enlarged partial side view of the separator, showing the crimped first hook portion.

The first hook portion 31 side is crimped with a jig 60 as shown in FIG. 14 to thereby be fixed after the separator 30 has been engaged with the opposed form panels 20. In using the jig 60, an air hose is previously connected to a nipple 61 provided at the rear end of the jig 60 so that compressed air is supplied. The compressed air is supplied into the jig 60 when an operation lever 62 is operated. Then, the pressure of the supplied compressed air is suitably increased by a power transmission mechanism (not shown) so that a crimp section 63 at the distal end side is driven so that teeth thereof are brought into mesh engagement with each other. The teeth of the crimp section 63 have vertical grooves 63a respectively. When the first hook portion 31 is crimped, the first hook portion 31 is held in the grooves 63a from outside and thereafter, the operation lever 62 is operated so that the teeth of the crimp section 63 are meshed as shown in FIG. 15. As a result, first hook portion 31 is crimped against the metal bar 22 to be reliably fixed as shown in FIG. 16. Subsequently, a plurality of the separators 30 are sequentially attached to the form panels 20 at predetermined intervals in the same manner as described above.

Accordingly, the second hook portion 32 is only engaged with the metal bar 22 and only the first hook portion 31 is crimped against the metal bar 22 to be fixed. As the result of the fixation at one side, the separator 30 can easily be attached to the form panels 20, and a labor saving can be achieved in the crimping work. Further, when a necessary working space is obtained at one form panel 20 side, the second hook portion 32 is engaged with the metal bar 22 at the one form panel 20 side. The first hook portion 31 is engaged with the metal bar 22 at the other form work 20 side to be crimped and fixed. In this case, too, the separator 30 can be attached to the form panels 20.

Since the second hook portion 32 is only engaged with the metal bar 22, there is a possibility that the second hook portion 32 may be disengaged from the metal bar 22 when subjected to a large force. However, the second hook portion 32 has a longer folded portion. Accordingly, the second hook portion 32 can be prevented from being disengaged from the metal bar 22 even when subjected to a large force. Further, the first and second hook portions 31 and 32 of the separator 30 are slightly displaced from each other axially so as not to be coplanar with each other. Consequently, the separator 30 can be prevented from clattering or the strength of the separator 30 against vibration can be improved. Further, since the separator 30 is attached to the metal bars 22 each of which has the larger diameter, the working personnel can easily find what the separator 30 should be attached to, and the strength of the overall separator 30 can be improved.

Figure 17:
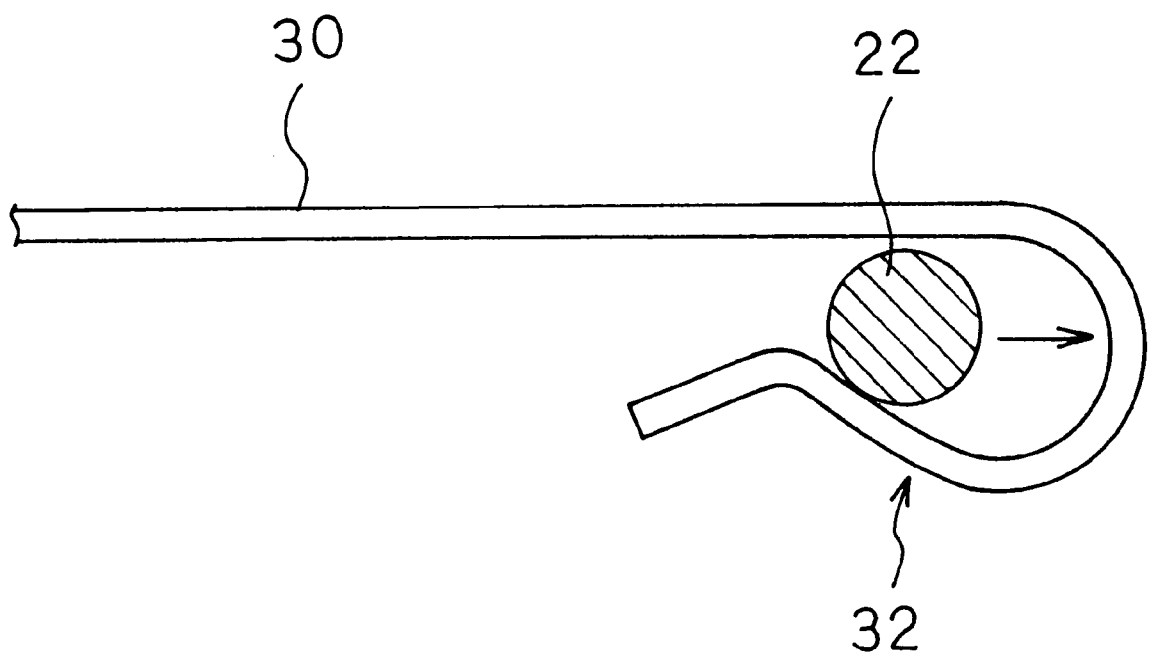
FIG. 17 is an enlarged partial side view of the second hook portion of the separator.

There is a case where the distance between the opposed form panels 20 becomes shorter than the original one depending upon the location of the separator 30 attached to the form panels 20. In this case, there is a possibility that a gap may be formed between the second hook portion 32 and the metal bar 22 as shown in FIG. 17. As a result, the strength of the formwork would be reduced. However, when concrete is placed as will be described later, the weight of the concrete increases the distances between the form panels 20. Consequently, the above-described gap is dissolved and accordingly, the strength of the formwork is not reduced.

Figure 18:
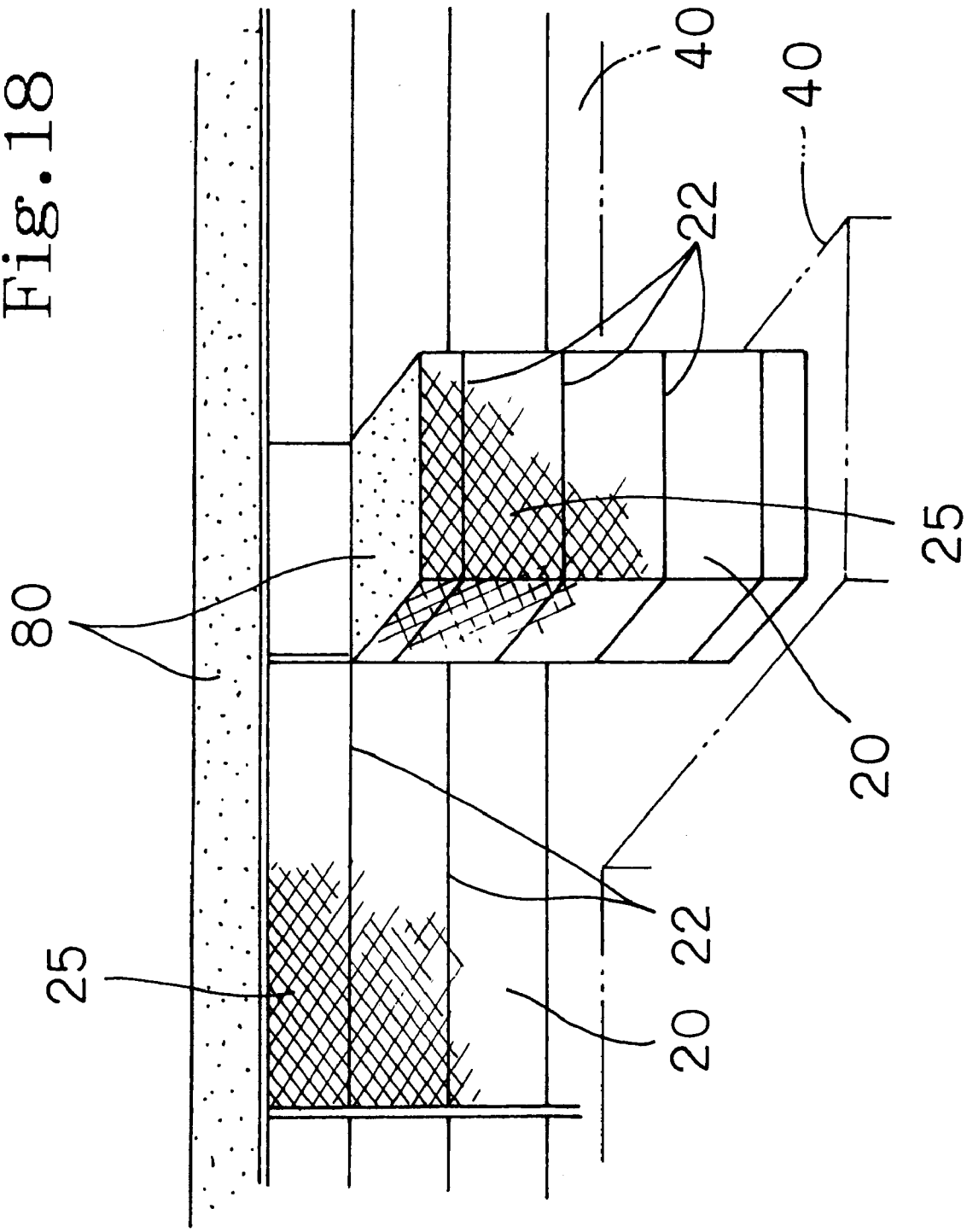
FIG. 18 is a schematic perspective view of the formwork of FIG. 6 in which concrete has been placed.

A pipe 70 is mounted to upper ends of the form panels 20 upon completion of attachment of the separators 30, as shown in FIG. 6. Dedicated separators 71 are used to hold the pipe 70 between the form panels 20 and themselves. The pipe 70 serves to shape the placed concrete on the upper edges of the form panels 20 and further to reinforce the formwork. The pipe 70 is detached after concrete 80 is placed from the upper opening of the formwork and before the concrete is hardened, as shown in FIG. 18. The concrete 80 then hardens while leaking from the meshes of the metal meshed member 25 by a slight amount. Since the form panels 20 are embedded in the concrete mold, the form panel 20 need not be disassembled. Consequently, a labor saving can be achieved and an amount of waste material can be reduced. Further, since a contact area of the concrete 80 placed via the metal meshed member 25 with air can be increased and the hardening of the concrete 80 is enhanced.

According to the foregoing embodiment, the form panel 20 is reinforced by the metal bars 22, the lengthwise and breadthwise wires 23 and 24 and formed into the shape of a frame. The metal net 25 is fixed to the form panel so as to cover the open side thereof. The form panels 20 are disposed to define the space in which the concrete is placed. The separator 30 has the first and second hook portions 31 and 32 formed by folding both ends thereof respectively. The hook portions 31 and 32 are engaged with the metal bars 22 of the form panels 20 opposed to each other so that the separator 30 bridges the form panels 20. The second hook portion 32 is crimped to be fixed such that the formwork is formed. Consequently, the formwork used to form the concrete mold can easily be formed, and the formwork can easily be disassembled. Further, the strength of the concrete mold can be improved.

Figure 19:
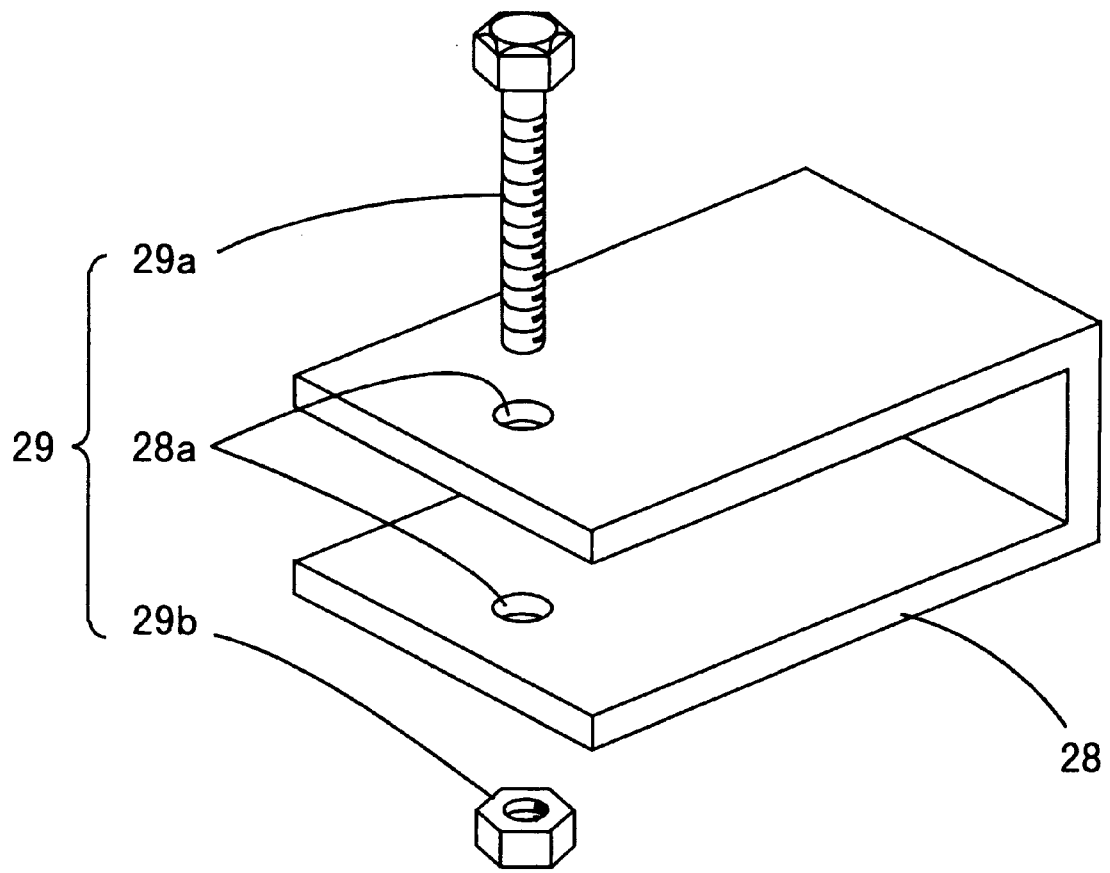
FIG. 19 is a perspective view of a connecting bracket and a fixing member.

The adjacent form panels 20 are bound together by winding the binding wire 26 on the metal support frames 21 in the foregoing embodiment. However, the form panels 20 can be bound more efficiently. Referring to FIG. 19, a connecting piece or connecting bracket 28 and a fixing member 29 are shown. The connecting bracket 28 is formed by bending a metal band plate into a U-shape. A space or width of the connecting bracket 28 is set so that the edge of the form panel 20 is allowed to be inserted thereinto. More specifically, the band plate is folded so that the space of the U-shaped portion becomes approximately equal to the sum of the thickness of the support frame 21 and the thickness of the metal mesh 25. The connecting bracket 28 has a pair of through holes 28a formed in the vicinity of an open end thereof. Bolts 29a serving as fixing members 29 are inserted through the holes 28a and fixed by a nut 29b.

Figure 20:
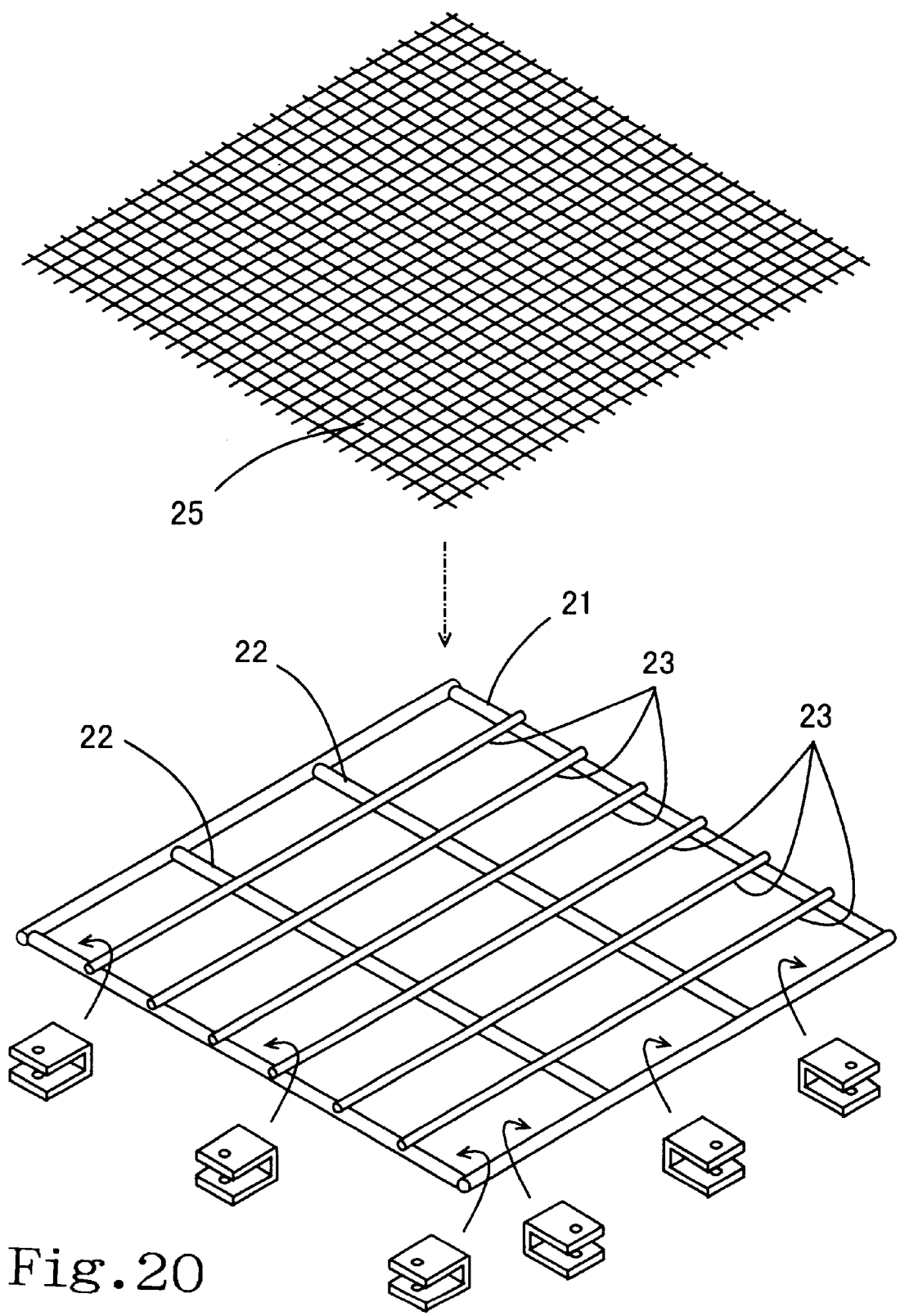
FIG. 20 is an exploded perspective view of the form panel and the connecting brackets, showing locations of the connecting brackets attached to the form panel.

FIG. 20 shows locations of the connecting brackets 28 on the support frame 21 respectively. Three connecting brackets 28 are welded to one of the lengthwise reinforcing bars of the support frame 21. Three connecting brackets 28 are also welded to one of the breadthwise reinforcing bars of the support frame 21. The freedom in the connection can be improved when the connecting brackets 28 are welded to the same locations. In this modified form, no breadthwise wires 24 are used. Thus, the breadthwise wires 24 may or may not be used.

Figure 22:
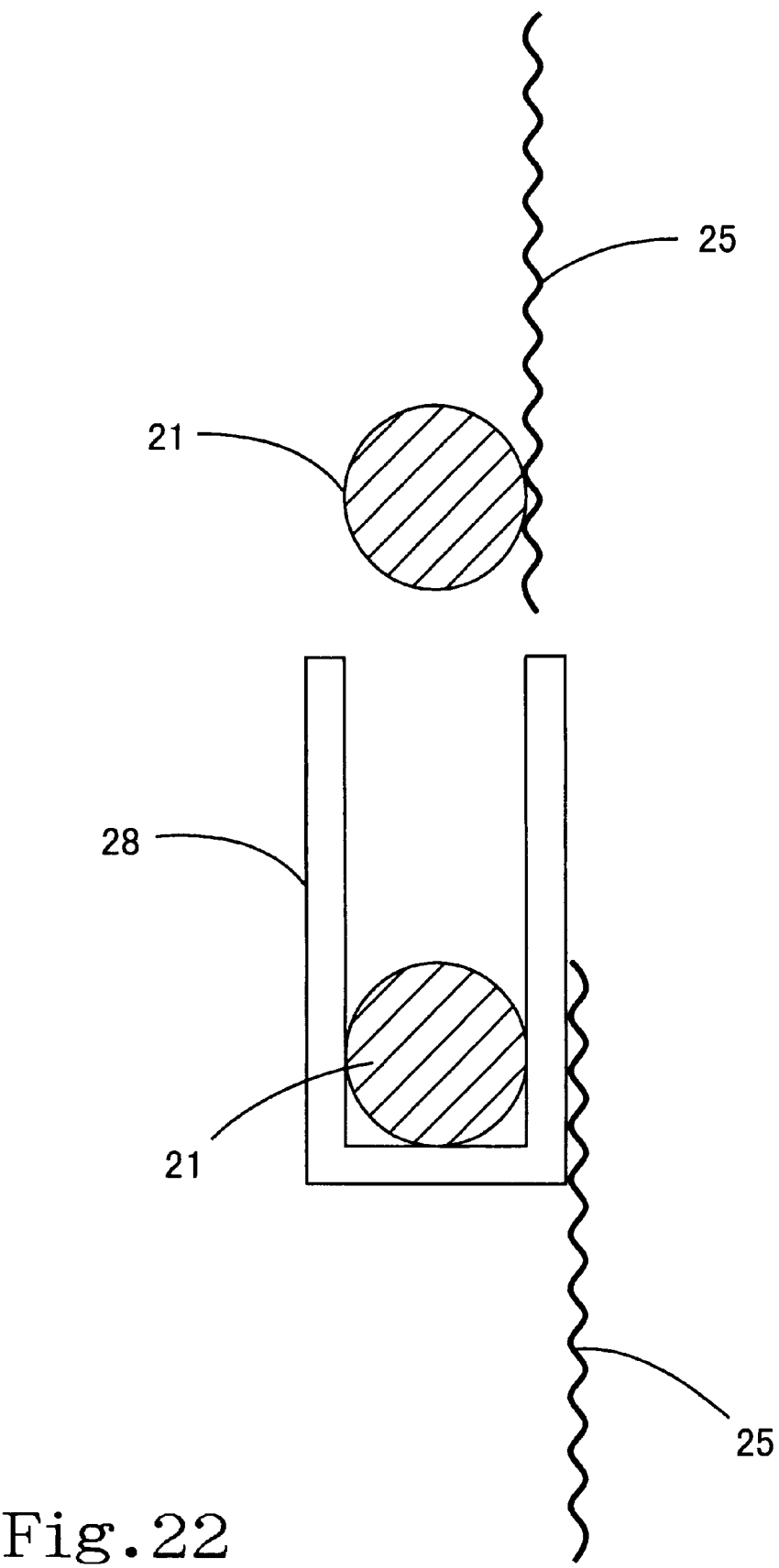
FIG. 22 is a schematic sectional view showing a step of connecting the form panels using the connecting brackets.
Figure 23:
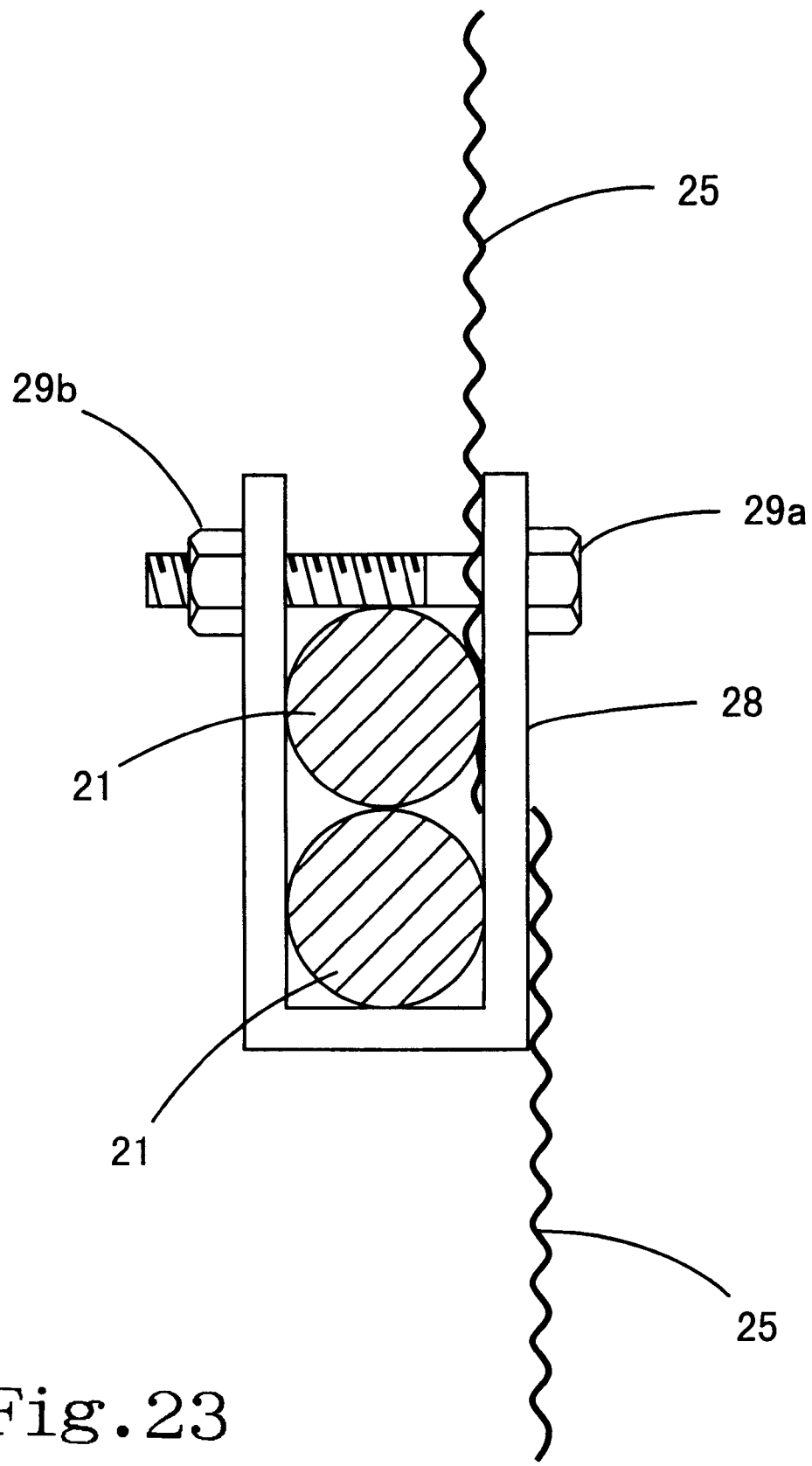
FIG. 23 is a schematic sectional view showing the connected form panels.

FIGS. 21 to 23 show the steps of connection of the form panels 20. First, for example, three form panels 20 are disposed so that the sides of two panels having no brackets 28 confront the sides of the other panel having the brackets 28 respectively, as shown in FIG. 21. The support frame 21 is then inserted into the opening portions of the connecting brackets 28 as shown in FIG. 22. When the support frame 21 is inserted deep into the opening portions of the brackets 28, the bolt 29a is inserted through the holes 28a and the nut 29a is engaged with the bolt 29a.

Figure 24:
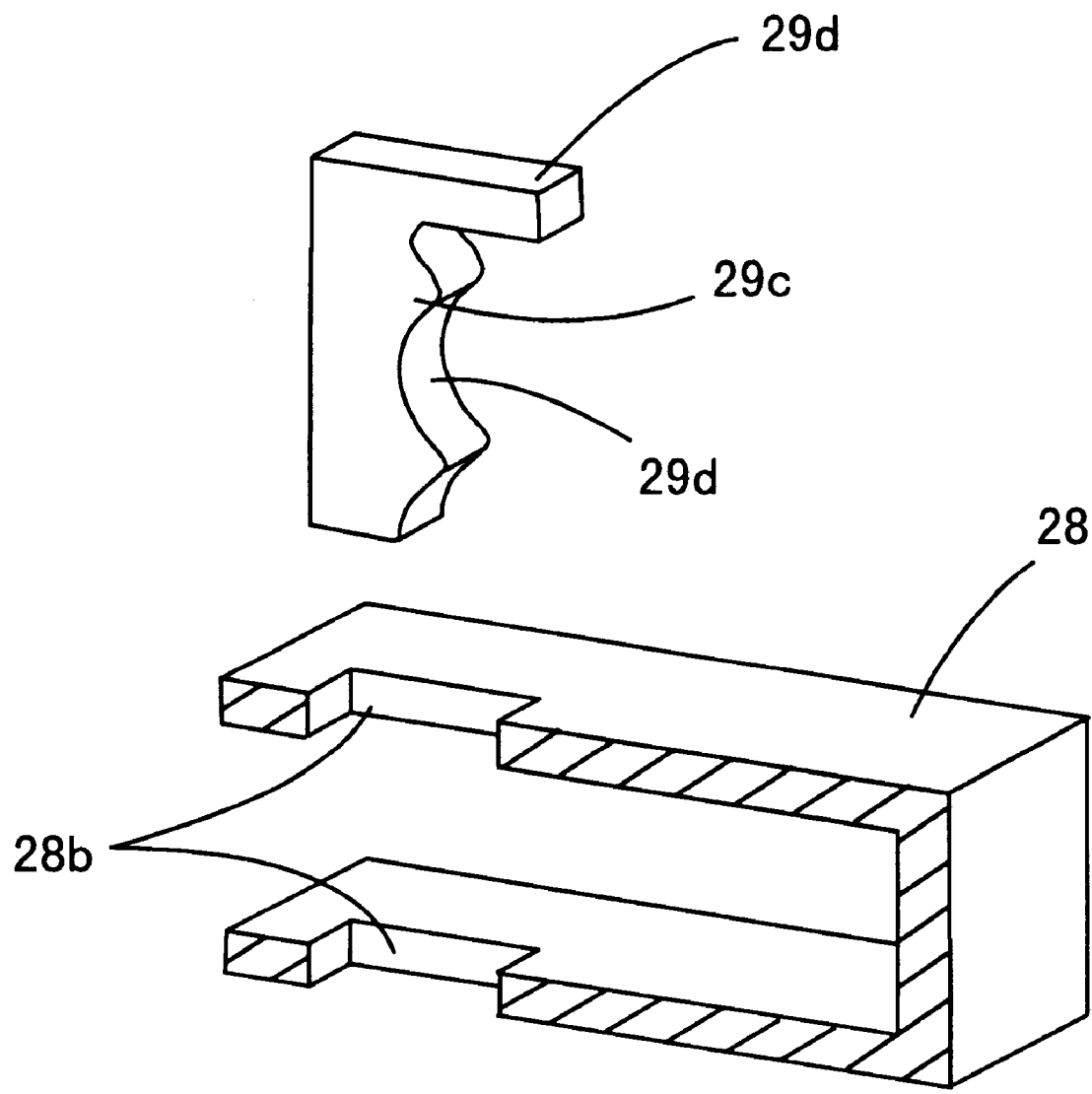
FIG. 24 is a partially broken perspective view of a modified form of the connecting bracket and the fixing member.
Figure 25:
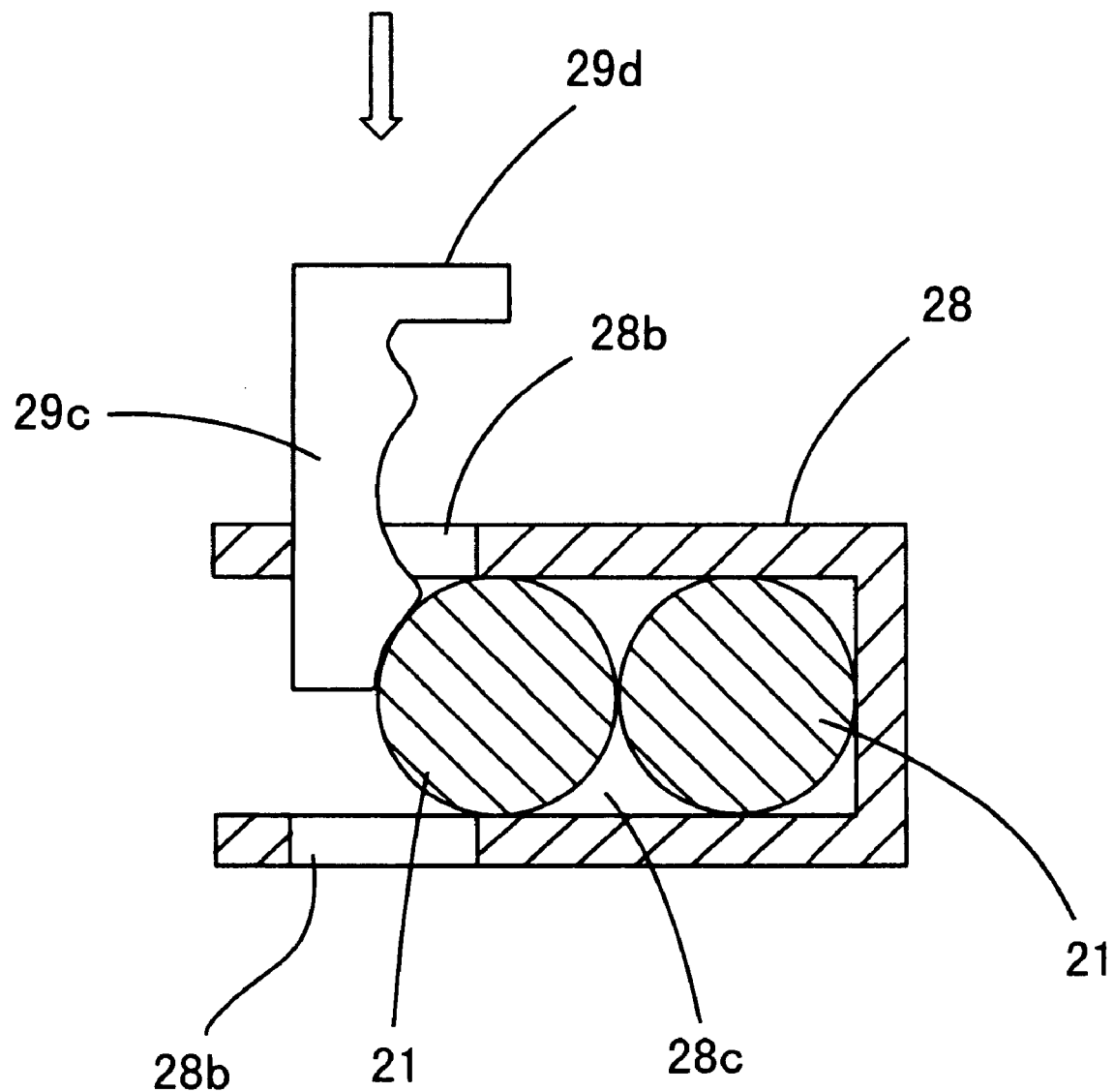
FIG. 25 is a schematic sectional view showing a step of connecting the form panels using the modified connecting brackets.

FIGS. 24 and 25 show modified forms of the bracket 28 and the fixing member 29. The connecting bracket 28 has two rectangular holes 28b, instead of the circular holes 28a, as shown in FIG. 24. The fixing member 29 is formed by cutting a flat plate similar to the band plate for the bracket 28. The fixing member 29 has a pointed protrusion 29c formed with a recess 29c1 at the distal end. The fixing member 29 further has a falling-off preventing end 29d having a larger width than the hole 28b. The fixing member 29 is inserted through the holes 28b so that the pointed protrusion 29c is directed to the folded end of the bracket 28.

Figure 26:
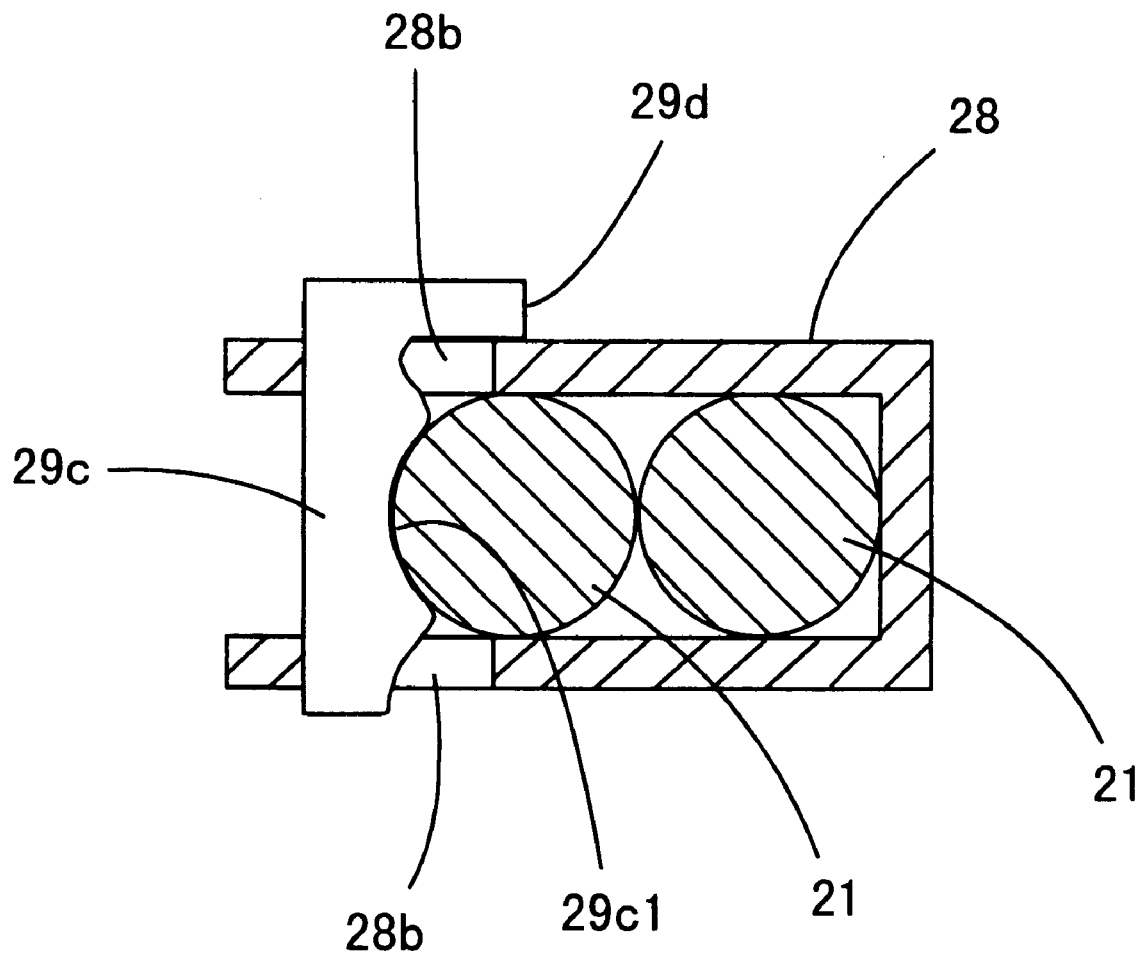
FIG. 26 is a schematic sectional view showing the connected form panels.

When the support frame 21 is inserted into the opening of the bracket 28, the fixing member 29 is inserted into one of the holes 28b as shown in FIG. 25. The pointed protrusion 29c of the fixing member 29 has such a height that it cannot be inserted smoothly. The fixing member 29 is hammered to be inserted through the holes 28b as shown in FIG. 26. The falling-off preventing end 29d is caught by the peripheral edge of the hole 28b such that the fixing member 29 is stopped. At this time, since the recess 29c1 is adjacent to the surface of the support frame 21, the fixing member 29 is prevented from falling off.

Figure 27:
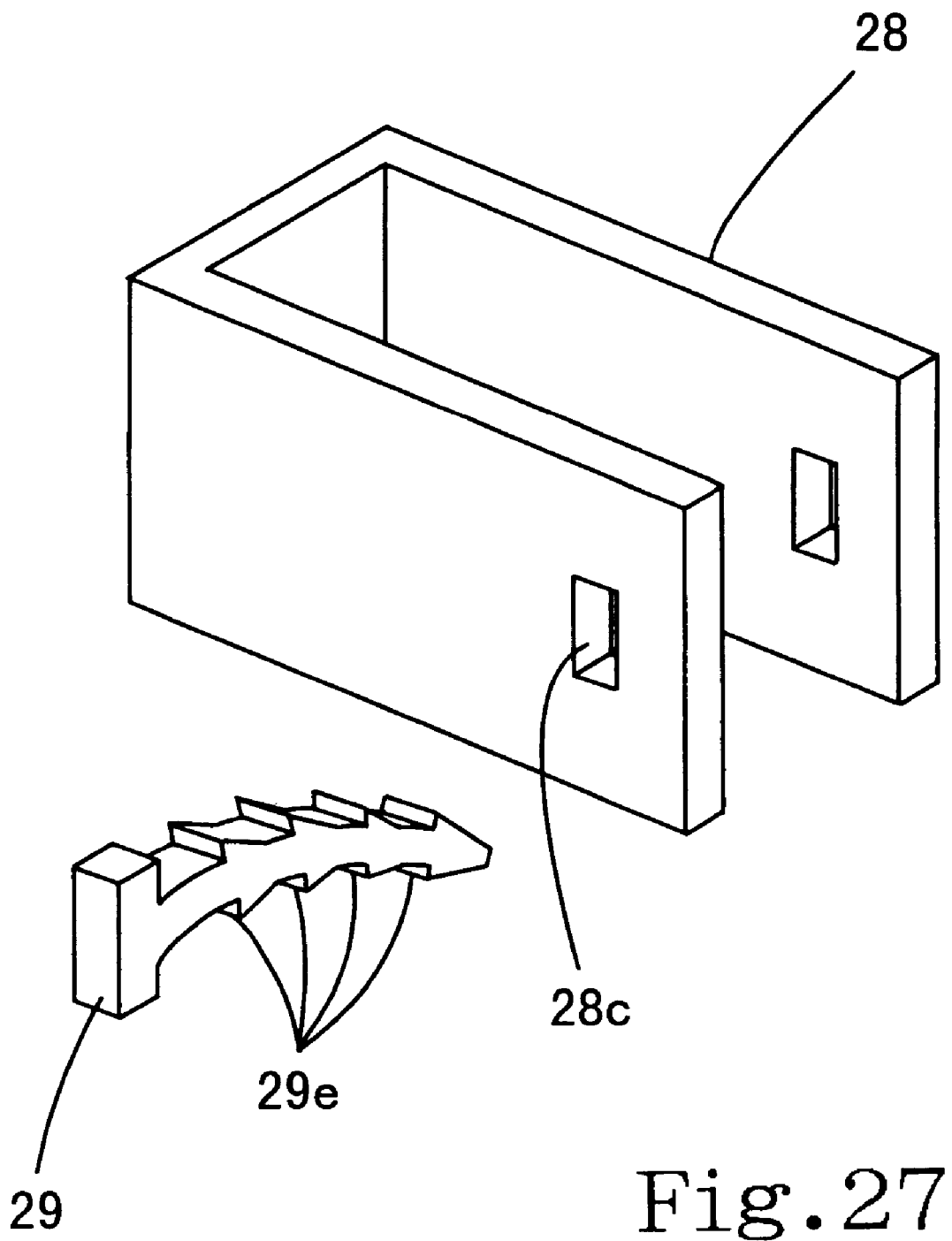
FIG. 27 is a partially broken perspective view of another modified form of the connecting bracket and the fixing member.
Figure 28:
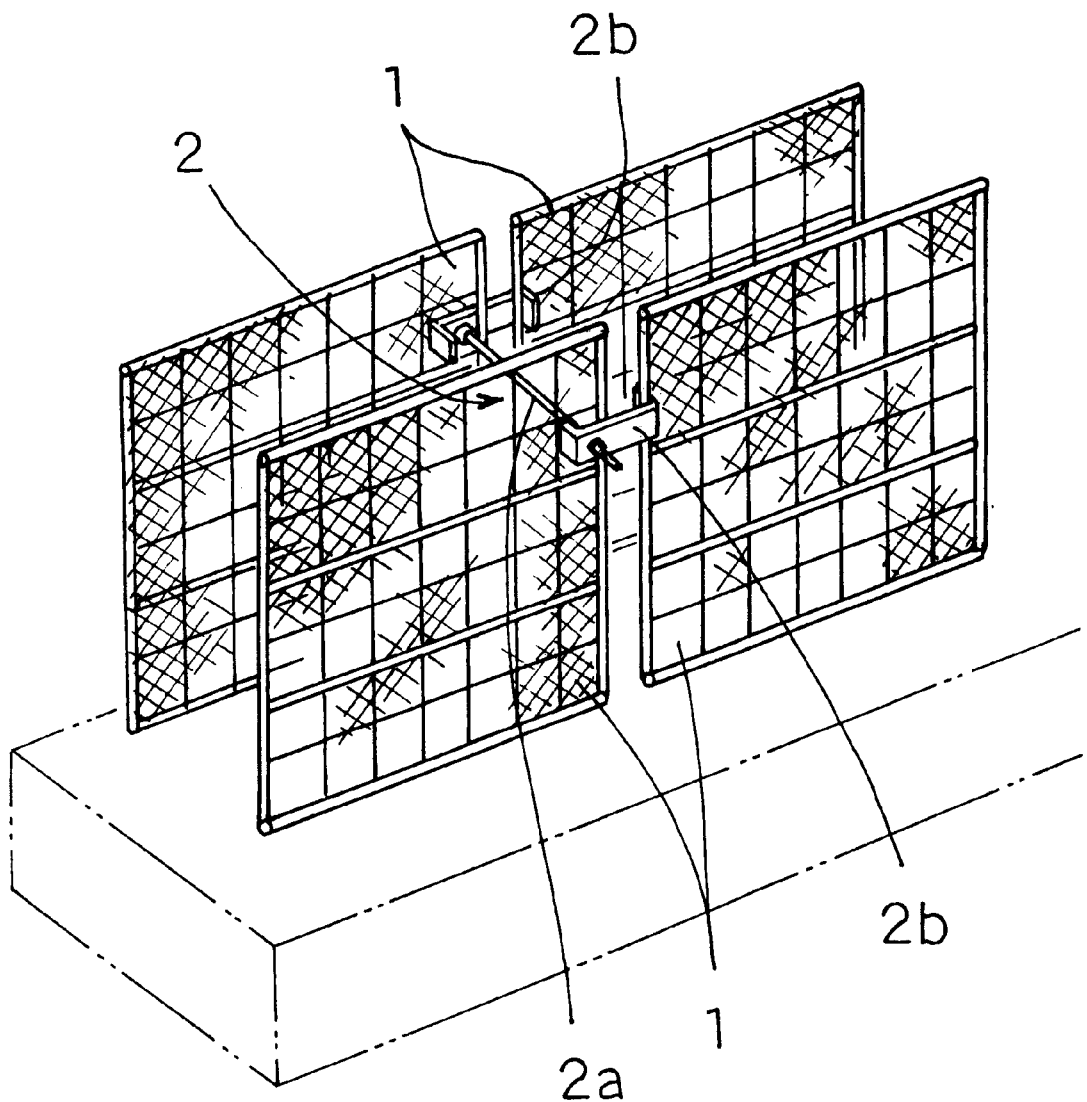
FIG. 28 is a perspective view of a formwork formed with a conventional formwork forming unit.

FIG. 27 shows another modified form. The fixing member 29 is formed into the shape of an elongate arc and has sawtooth protrusions 29e. The fixing member is just inserted through the holes 28c. In this case, the fixing member 29 may or may not be engaged. When happening to be pushed back, the fixing member 29 is caught by the peripheral edge of the hole 28c such that it is prevented from falling off. The fixing member 29 has a sufficient thickness so that a reliable fixation can be achieved when the fixing member 29 is just inserted through the holes 28c.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A formwork forming unit comprising:

two generally frame-shaped form panels oppositely disposed to define a placing space for concrete, each of the form panels including a plurality of first reinforcing beams and a plurality of second reinforcing beams each of which has a smaller diameter than each first reinforcing beam and formed into a shape of a frame, each of the form panels further including a meshed member fixed thereto so as to cover one side thereof; and a generally bar-shaped separator attached to the oppositely disposed form panels so as to bridge the form panels when the form panels are disposed to define the placing space for the concrete, the separator having both ends folded so as to be formed into hook portions respectively, each of the hook portions being engaged with one of the first beams of one of the oppositely disposed form panels and crimped such that the separator is fixed to the form panels, wherein at least one of the form panels includes a connecting piece provided on an edge of said at least one of the form panels so as to have an outwardly open side and a fixing member blocking the open side of the connecting piece when the edge of another form panel is inserted into an interior of the connecting piece, the connecting piece including a pair of band plate pieces confronting each other with a clearance therebetween, the clearance being approximately equal to a thickness of said at least one of the form panels, the band plate pieces having through holes formed near open ends thereof respectively, and the fixing member being inserted through the holes of the band plate pieces, thereby closing the open side of the connecting piece.

2. A formwork forming unit according to claim 1, wherein the connecting piece is formed by folding a single band plate piece generally into a U-shape and the first beam forming a panel of the form panel is fitted into an inside of the U-shaped connecting piece.

* * * * *